(12) United States Patent
Maruo

(10) Patent No.: US 8,154,758 B2
(45) Date of Patent: Apr. 10, 2012

(54) APPARATUS CAPABLE OF USING MEMORY-EQUIPPED SHEET AND SHEET SELECTION APPARATUS

(75) Inventor: Osamu Maruo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1116 days.

(21) Appl. No.: 11/996,342

(22) PCT Filed: May 22, 2007

(86) PCT No.: PCT/JP2007/060755
§ 371 (c)(1),
(2), (4) Date: Jan. 21, 2008

(87) PCT Pub. No.: WO2007/136128
PCT Pub. Date: Nov. 29, 2007

(65) Prior Publication Data
US 2009/0091794 A1    Apr. 9, 2009

(30) Foreign Application Priority Data

May 24, 2006  (JP) ................. 2006-144523
Mar. 9, 2007   (JP) ................. 2007-059293

(51) Int. Cl.
H04N 1/00     (2006.01)
(52) U.S. Cl. ............ 358/1.16; 358/1.18; 358/403
(58) Field of Classification Search ........... 358/1.16, 358/1.18, 400, 401, 403, 404, 444
See application file for complete search history.

(56) References Cited

U.S. PATENT DOCUMENTS

| 4,508,329 | A | 4/1985 | Hubler et al. |
| 6,827,279 | B2 | 12/2004 | Teraura |
| 7,812,981 | B2 * | 10/2010 | Minami et al. ............ 358/1.15 |
| 2002/0170973 | A1 | 11/2002 | Teraura |
| 2004/0046985 | A1 | 3/2004 | Watanabe et al. |
| 2004/0099742 | A1 | 5/2004 | Minami et al. |
| 2006/0017950 | A1 | 1/2006 | Ikegami et al. |
| 2006/0038685 | A1 | 2/2006 | Kiwada et al. |

FOREIGN PATENT DOCUMENTS

| EP | 1583348 A1 | 10/2005 |
| JP | 6-51434 | 7/1994 |
| JP | 2001-229199 | 8/2001 |
| JP | 2001229199 A * | 8/2001 |
| JP | 2002-337426 | 11/2002 |
| JP | 2003-33298 | 11/2003 |
| JP | 2004-66692 | 3/2004 |
| JP | 2004-152260 | 5/2004 |
| JP | 2004-192610 | 7/2004 |

(Continued)

OTHER PUBLICATIONS

Jun. 30, 2009 European search report in connection with a counterpart European patent application No. 07 74 4189.

*Primary Examiner* — Thomas D Lee
(74) *Attorney, Agent, or Firm* — Cooper & Dunham LLP

(57) ABSTRACT

An apparatus capable of using a memory-equipped sheet, in which a memory device is provided to a sheet, comprises a selection part that selects a specific memory-equipped sheet from a plurality of memory-equipped sheets based on information stored in the memory device on the memory-equipped sheets.

10 Claims, 18 Drawing Sheets

FOREIGN PATENT DOCUMENTS

| | | |
|---|---|---|
| JP | 2004-310293 | 11/2004 |
| JP | 2005-94369 | 4/2005 |
| JP | 2005-95897 | 4/2005 |
| JP | 2005-101935 | 4/2005 |
| JP | 3687413 | 6/2005 |
| JP | 2005-319672 | 11/2005 |
| JP | 2005-322133 | 11/2005 |
| JP | 2006-58345 | 3/2006 |

\* cited by examiner

FIG.3

| LIST# | DOCUMENT ATTRIBUTE DATA | DOCUMENT PRINT DATA |
|---|---|---|
| 1 | DOCUMENT ATTRIBUTE DATA | DOCUMENT PRINT DATA |
| 2 | DOCUMENT ATTRIBUTE DATA | DOCUMENT PRINT DATA |
| 3 | DOCUMENT ATTRIBUTE DATA | DOCUMENT PRINT DATA |
| 4 | DOCUMENT ATTRIBUTE DATA | DOCUMENT PRINT DATA |
| ⋮ | ⋮ | ⋮ |
| N | DOCUMENT ATTRIBUTE DATA | DOCUMENT PRINT DATA |

DOCUMENT LIST 200, 201, 202, 203

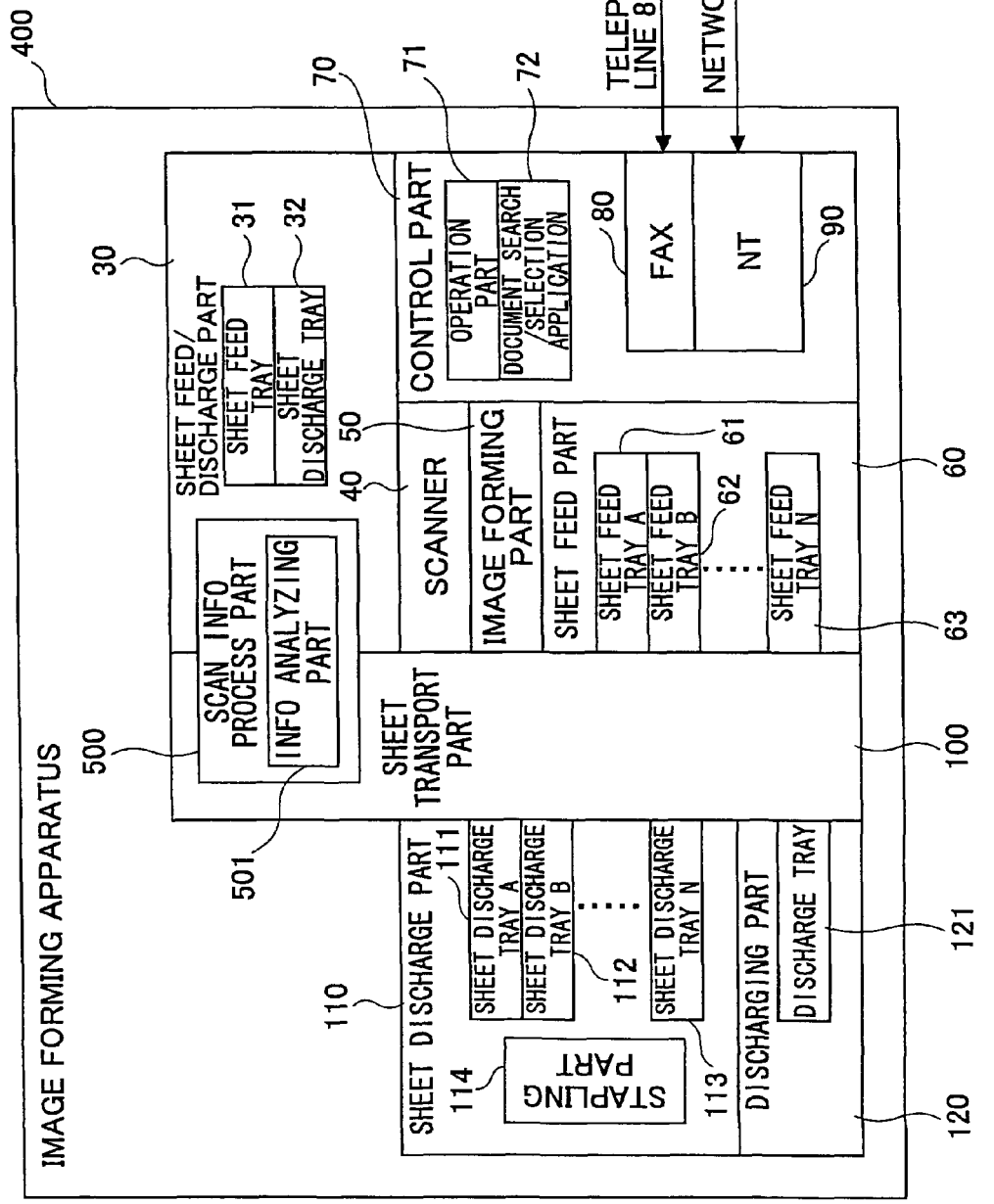

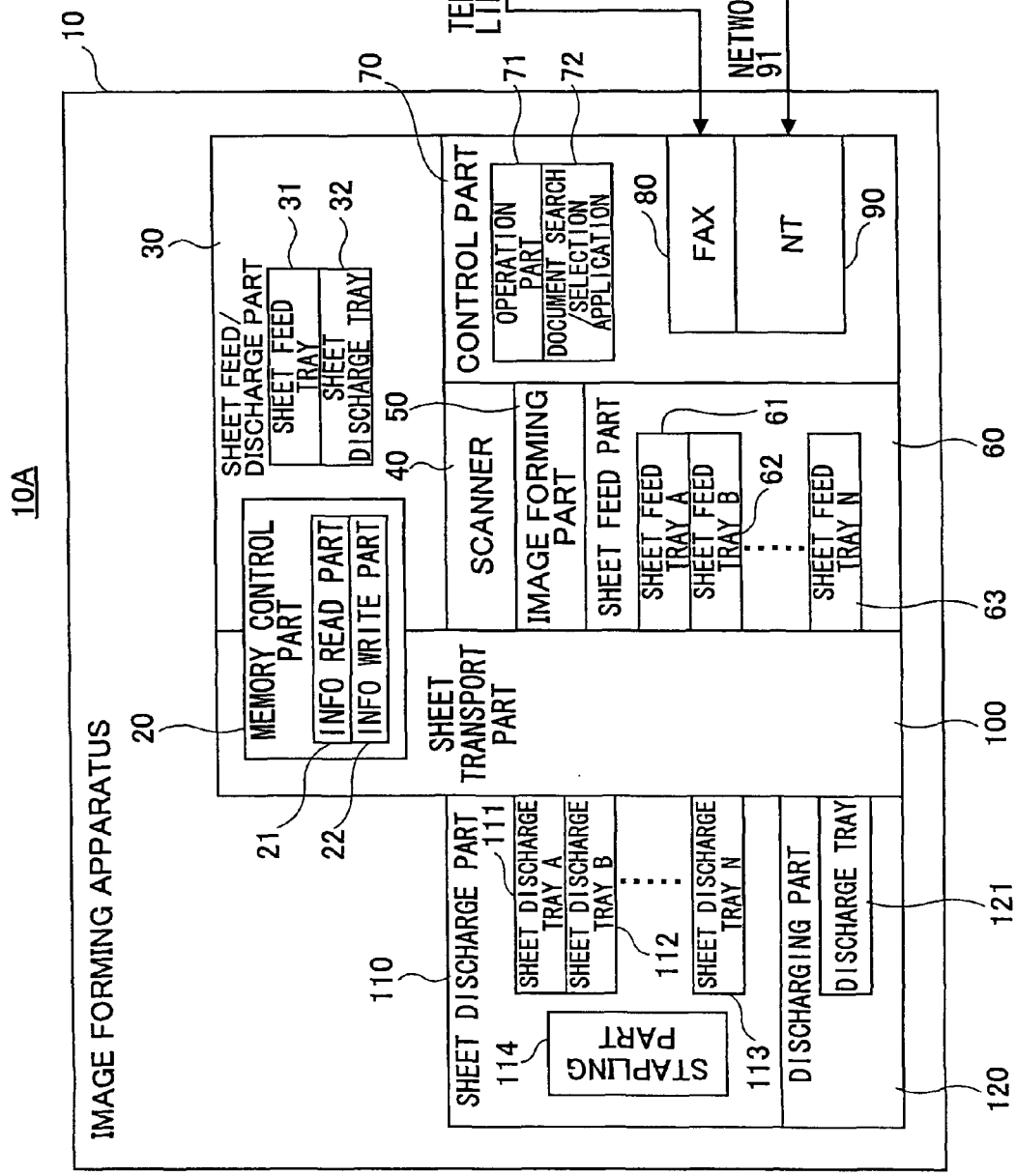

APPARATUS CAPABLE OF USING MEMORY-EQUIPPED SHEET AND SHEET SELECTION APPARATUS

TECHNICAL FIELD

This disclosure generally relates to apparatuses capable of using memory-equipped sheet. This disclosure encompasses various apparatuses such as image forming apparatus, document searching apparatus, document selection apparatus, document discarding apparatus, image reading apparatus, communication apparatus, and further a document list creating apparatus and sheet selection apparatus.

BACKGROUND ART

According to Patent References 1 and 2, printing sheets or delivery tickets equipped with RFDI (radio frequency identification) tag have been known conventionally.

Such sheets integrated with memory devices are called "memory-equipped sheet". Here, it should be noted that the medium of the sheet is not limited to paper. For the apparatus that uses such a memory-equipped sheet, the foregoing Patent Reference 1 cites printers, copiers and facsimile apparatuses, wherein these apparatuses carry out image formation on such memory-equipped sheets and further carry out reading and writing of information from and to the memory device provided to the sheets.

Further, Patent Reference 3 describes a scanner device that reads from memory-equipped sheets, while Patent Reference 4 describes a shredder apparatus that discards such memory-equipped sheets. Further, Patent Reference 6 describes a facsimile apparatus transmitting information on the memory-added sheets by way of facsimile transmission, while Patent Reference 7 describes an apparatus that carries out Internet facsimile transmission of the information on the memory-equipped sheets over a network. Further, Patent Reference 8 describes an image forming apparatus that uses memory-equipped sheets according to the security information held in the equipped memory device, while Patent Reference 9 describes image forming sheets equipped with memory device and a document management server. Further, Patent Reference 10 describes an image forming apparatus that processes memory-equipped sheets according to the security information.

(Patent Reference 1)
Japanese Laid-Open Patent Application 2002-337426
(Patent Reference 2)
Japanese Laid-Open Patent Application 2000-335710
(Patent Reference 3)
Japanese Laid-Open Patent Application 2005-101935
(Patent Reference 4)
Japanese Laid-Open Patent Application 2005-095897
(Patent Reference 5)
Japanese Patent Publication 06-051434
(Patent Reference 6)
Japanese Laid-Open Patent Application 2003-333298
(Patent Reference 7)
Japanese Laid-Open Patent Application 2005-094369
(Patent Reference 8)
Japanese Laid-Open Patent Application 2004-152260
(Patent Reference 9)
Japanese Laid-Open Patent Application 2004-192610
(Patent Reference 10)
Japanese Laid-Open Patent Application 2004-066692

While such memory-equipped sheets, or the apparatuses that carry out processes such as image formation, image reading, discarding, stapling, facsimile transmission with regard to such memory-equipped sheets, have been known in the art, the conventional technology of this field mainly focuses upon the function of traceability and security, and problems still remain with regard to the efficiency for the user to carry out operation while using such memory-equipped sheets.

In the case of handling sheets containing plural documents, for example, there often arises a situation in which it is desired to take out a specific sheet out from a plurality of sheets for confirmation of the contents. However, there exits no such an apparatus that can select a desired sheet, and thus, it has been necessary for the user to take out the sheets one by one while confirming the contents thereof. Thus, there has been a problem of poor work efficiency with regard to such an operation of the user.

BRIEF SUMMARY

In an aspect of this disclosure, there are provided an apparatus that uses memory-equipped sheets, a document list creation apparatus, and a sheet selection apparatus, wherein the efficiency of operation of user is improved with regard to handling of the sheets.

In another aspect, the apparatus that uses the memory-equipped sheets has a construction of having the means of selecting a specific memory-equipped sheet from a plurality of memory-equipped sheets based on the information recorded on the memory-equipped sheets.

Preferably, the aforementioned apparatus includes means for creating a document list with regard to the plural memory-equipped sheets based on the information recorded on the memory-equipped sheets and outputting the document list thus created. Further, it is preferable to select a specific memory-equipped sheet based on an input keyword, by carrying out a keyword search.

Further, the aforementioned apparatus uses the memory-equipped sheets includes the means for creating a document list with regard to the plural memory-equipped sheets based on the information recorded on the memory-equipped sheets and outputting the created document list.

Here, it is preferable that the apparatus has the means for selecting a specific memory-equipped sheet with regard to the output document list.

With the apparatuses that are capable of using the memory-equipped sheets according to an aspect of this disclosure, it is possible to provide the means for distributing, sorting, copying, reading, printing, discarding, stapling the memory-equipped sheets and also the means for transmitting information therein by way of facsimile or by way of mail or by way of Internet facsimile.

In another aspect of this disclosure. there is provided a sheet selection apparatus that selects a desired sheet from a plurality of sheets, the sheet selection apparatus being equipped with the means for selecting a specific sheet holding thereon specific information based on the information held on the sheet.

Further, according to another aspect of this disclosure, there is provided a sheet selection apparatus that selects a desired sheet from a plurality of sheets, the sheet selection apparatus being equipped with the means for creating and outputting a list with regard to the sheets based on the information held on the sheets.

According to such sheet selecting apparatus, the information held on a memory-equipped sheet may be the information that specifies that sheet or the information that specifies the attribute of that sheet.

According to the aforementioned apparatus that can use the memory-equipped sheet, it becomes possible to eliminate unnecessary work of a user at the time of searching a desired memory-equipped sheet out of a plurality of memory-equipped sheets as a result of the construction thereof in which there is provided the means for selecting a specific memory-equipped sheet out from the plurality of memory-equipped sheets based on the information recorded to the memory-equipped sheets or as a result of the construction thereof in which there is provided the means for creating and outputting the list of the plurality of memory-equipped sheets based on the information recorded to the memory-equipped sheets. With this, the efficiency of the work of the user is improved.

According to the aforementioned sheet selection apparatus, it becomes possible for a user to eliminate unnecessary work at the time of searching a desired sheet out from a plurality of sheets as a result of the construction thereof in which there is provided the means for selecting the sheet holding specific information out from a plurality of sheets based upon the information held on the sheets or as a result of the construction thereof in which there is provided the means for creating and outputting a list of the plurality of sheets based on the information held on the sheets.

BRIEF DESCRIPTION OF THE DRAWINGS

FIG. 3 is a diagram explaining an example of output of a document list;

FIG. 17 is a schematic diagram explaining an example of a multi-functional image forming apparatus implemented as a sheet selection apparatus according to the present invention;

FIG. 18 is a schematic diagram showing another example of a multi-functional image forming apparatus implemented as the apparatus capable of using the memory-equipped sheets of the present invention.

BEST MODE FOR IMPLEMENTING THE INVENTION

Hereinafter, the present invention will be described in detail for embodiments with reference to the drawings. First, an example of a memory-equipped sheet of the present invention will be explained with reference to FIG. 1.

Figure 1:
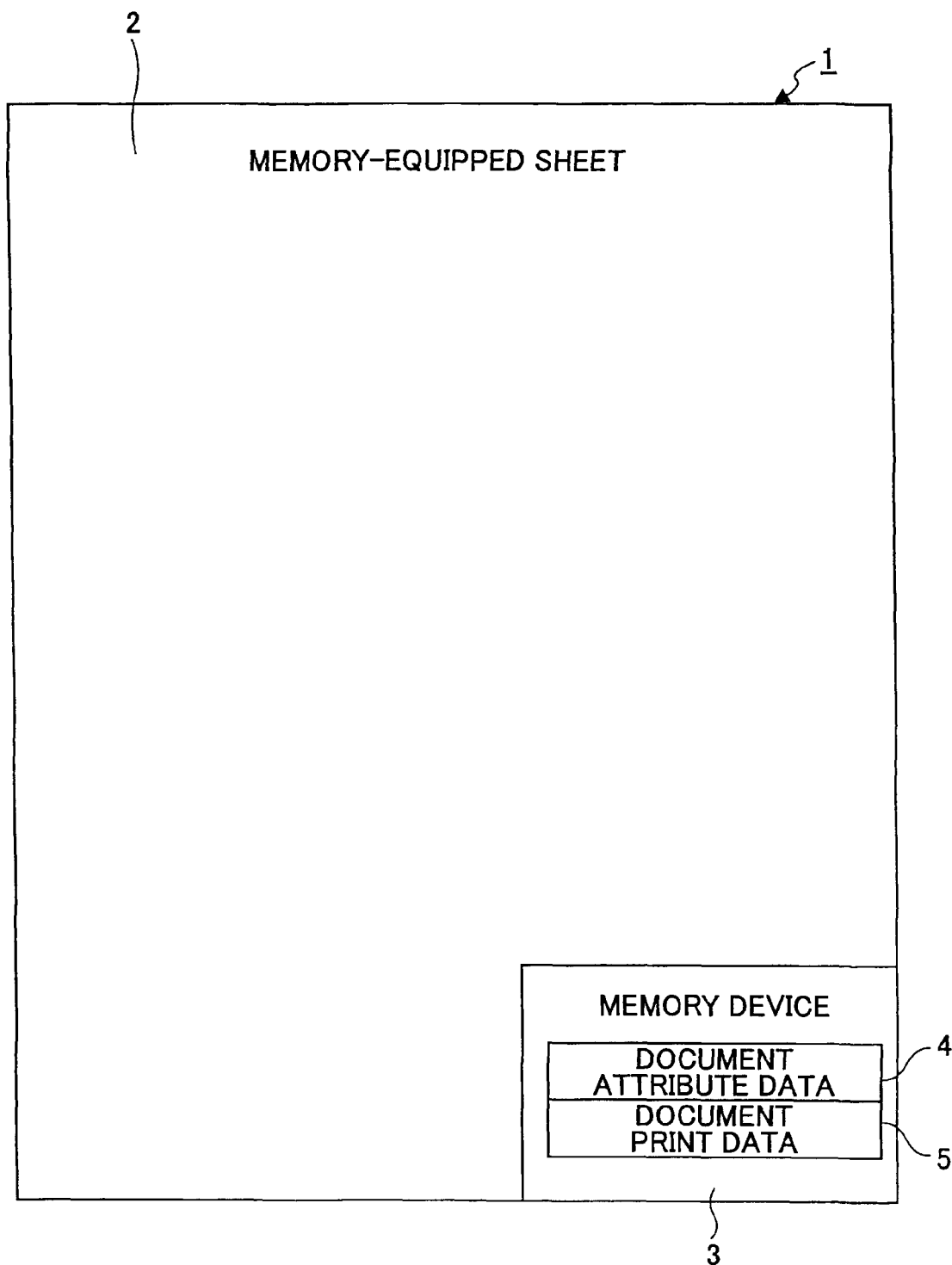
FIG. 1 is a diagram explaining an example of the memory-equipped sheet according to the present invention.

Referring to FIG. 1, it can be seen that a memory-equipped sheet 1 includes a memory device 3 on a sheet 2. The memory device 3 stores therein document attribute data 4 and document print data 5.

In the memory device 3, the document attribute data 4 and the document printing data 5 are stored at the time of writing information with the data format designed in anticipation of information reading conducted by arbitrary memory part control device. Thereby, it should be noted that the information with regard to the foregoing format is recorded to any of the memory part control device, the memory device 3 or both of them, and reading of information is made from the memory device 3 based on the format information.

Here, it should be noted that the document attribute data 4 represents the information necessitated for document control, irrespective of whether it is formed as visual information on the sheet 2 on which image formation is made already or not.

For example, a typical business document may include the items below for the document attribute data 4.

[DOCUMENT NAME] Representation of document name

[DOCUMENT VERSION NUMBER] The version number for distinguishing the documents under the same document name

[DOCUMENT PAGE NUMBER] The page number for the documents under the same document name

[DOCUMENT TOTAL PAGE NUMBER] Total number of pages for the same document name

[SHEET TYPE] Designation of the type of the sheets such as material, sheet size, brand, etc

[INTERNAL USE SETTING] Designation of secrecy to outside and setting of the term thereof

[SECURITY SETTING] Indication of importance of the document

[DOCUMENT CREATION DATE AND TIME] Designation of date and time of creation of the document

[DOCUMENT UPDATING DATE AND TIME] Designation of date and time of updating of the document

[DOCUMENT RECORDING DATE AND TIME] Designation of date and time in which image formation and information recording has been made to the memory-equipped sheets

[DOCUMENT RECORDING PERSON] Designation of the person who has made image formation and information recording to the memory-equipped sheets

[DOCUMENT RECORDING APPARATUS] Designation of the information apparatus that has been used for the image formation and information recording

[DOCUMENT EXPIRATION DATE] Designation of existence or non-existence of document expiration date and date and time of expiration

[DOCUMENT STORAGE PERIOD] Designation of existence or non-existence of document storage period and date and time of expiration of document storage period

[DOCUMENT CONTROL NUMBER] Arbitrary document control number

[DOCUMENT CREATOR] Designation of creator of the document

[DOCUMENT UPDATER] Designation of updater of the document
[DOCUMENT REVIEWER AND ACKNOWLEDGER] Reviewer and acknowledger of the document
[DOCUMENT ATTRIBUTE DATA STRUCTURE SETTING]
Structural information of document attribute data on the memory (format)
[REMARKS] Item for describing free word notes for the supplementary information of the document In controlling the foregoing document attribute data, it is also possible to include arbitrary but distinguishable information other than proper name such as affiliation information or proper identification number with regard to apparatuses or persons.

Further, with regard to the information for date and time, the information used herein includes all the information regarding time such as year, month, day, time, GMT setting (Greenwich mean time and deviation therefrom).

In addition to the foregoing, there may be items for document attribute data 4 based on facsimile and forms. Some preferable examples will be explained below.

[SENDER] Designation of the person who is the sender of the document or goods
[RECEPIENT] Designation of the person who is the recipient of document or goods
Further, [ZIP code], [ADDRESS]. [TELEPHONE NUMBER], [FAX NUMBER] [E-MAIL] and [URL] of sender and recipient are also regarded as the document attribute data.

In addition, following items may be used as the unique information of the document or goods to be delivered.
[CHARGING INFORMATION] Charging information for the case delivery incurs expense. Alternatively, there may be information regarding items that hold information with regard to the condition of fee payment such as shipper prepayment or payment on arrival.
[ACCEPTANCE DATA AND TIME] Acceptance date and time of the apparatus or agent responsible for delivery of document or goods
[ACTUAL SHIPPING DATE AND TIME] The date and time of actual shipping of the document or goods after acceptance
[PREDICTED ARRIVAL TIME] Predicted date and time in which the recipient receives the document or goods
[Actual ARRIVAL TIME] Actual date and time in which the recipient has received the document or goods
[MODE OF PACKING, CONTENT OF PACKIGN] Information regarding appearance of the document or goods and information indicating what the document or goods is
[VARIOUS CONTROL NUMBERS] Various slip numbers incurred during creation of the document with regard to delivery of the document or goods and unique recognition number issued at the time of reception by the apparatus or agent responsible for the delivery
[WEIGHT, NUMBER OF PIECES] Information regarding weight and number of pieces of the document and goods
[FORM] Information regarding the type of the form, such as shipper's copy, slip, delivery slip, acknowledging slip, carrier's arrival copy, carrier's shipping copy, invoice, caution information for delivery such as "fragile!", and the like. Further, there may be items regarding vibration or shock, temperature control, and the like.

Here, it should be noted that the document print data 5 is the information that is used at the time of formation or the information needed at the time of re-formation of images already formed on the sheet 2.

It should be noted that, while the document attribute data 4 is formed primarily by the recognition information of the document irrespective of whether or not there is already formed images on the sheet 2, the document print data 5 is basically the data that becomes necessary at the time of printing the information on the sheet 2.

The document print data 5 includes: general document data (such as text data, Word data, Excel data, PDF data, etc.), which can be created and edited by external information processing terminal (such as personal computers connected to network or general computer); general image data (of the format of JPG, GIF, TIFF, BMP, etc.); or a printable word data (PDL, PCL, etc.) capable of being processed by the image forming apparatus.

Next, a multifunctional image forming apparatus that includes the document list creation apparatus of the present invention will be explained with reference to FIG. 2 as an example of the apparatus capable of using the memory-equipped sheet of the present invention. It should be noted that FIG. 2 is a schematic diagram showing the functions of various parts of the multifunctional image forming apparatus.

Figure 2:
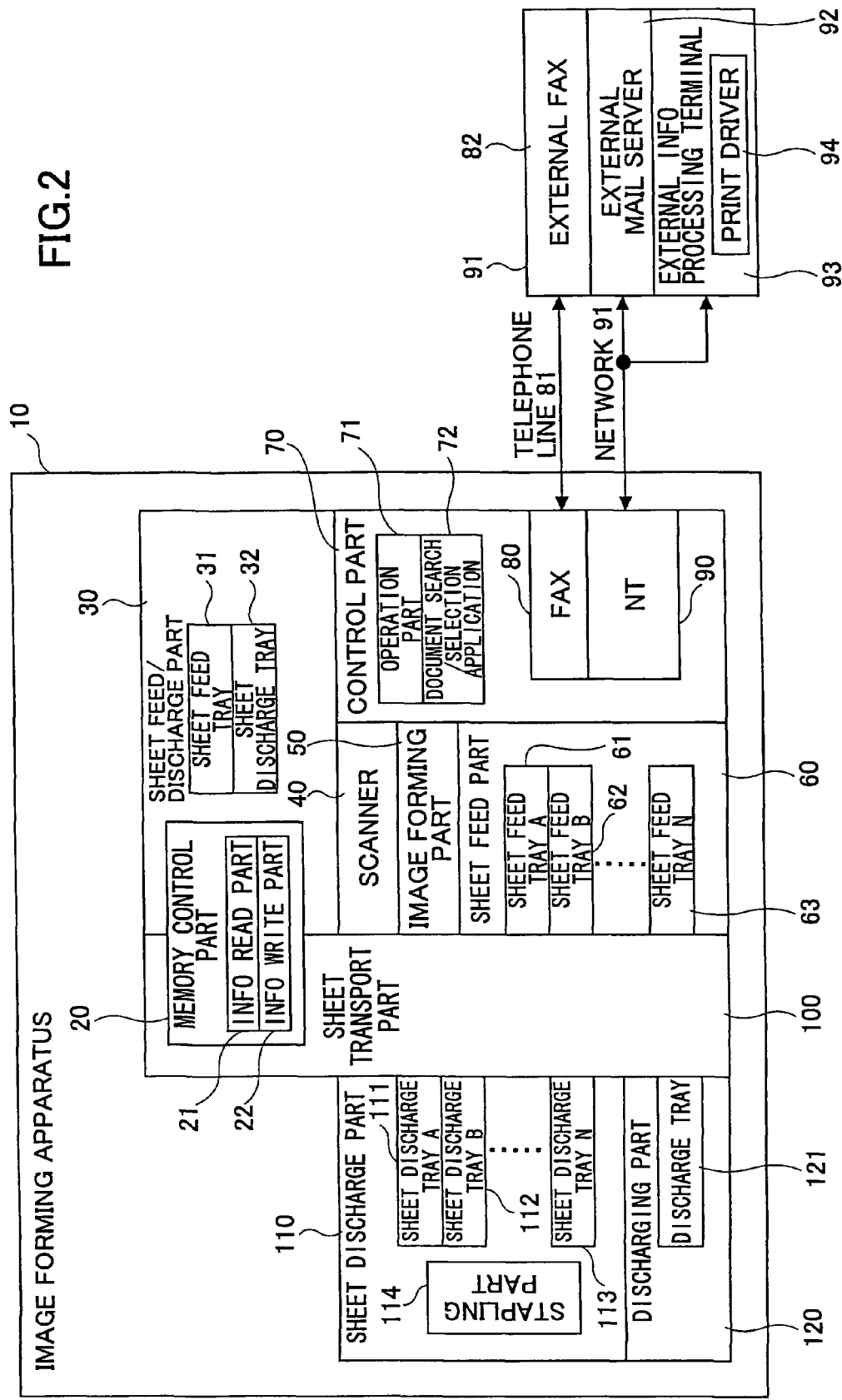
FIG. 2 is a schematic diagram showing an example of a multi-functional image forming apparatus implemented as the apparatus capable of using the memory-equipped sheets of the present invention.

Referring to FIG. 2, an image forming apparatus 10 comprises a memory control part 20 that includes therein: information reading part 21 that reads the information from the memory device 3 provided to the sheet 2; an information writing part 22; a sheet feeding and discharging part 30 that includes therein a sheet feed tray 31 and a sheet discharging tray 32; a scanner part 40; an image forming part 50; a sheet feed part 60 including therein a sheet feed tray A61, a sheet feed tray B62 and a sheet feed tray N63; an apparatus control part 70 including therein an apparatus operation part 71 and document search and selection application (program) 72 that functions also as the means for creating a document list; a facsimile apparatus part 80; a network apparatus part 90; a sheet transportation part 100; a sheet discharging part 110 that includes therein a discharge tray A111, a discharge tray B112 and a discharge tray N113; a stapling apparatus part 114; and a discarding apparatus part 120 that includes therein a discard tray 121.

This image forming apparatus 10 may be connectable to an external information processing terminal 93 including therein a printer driver 94 or to an external facsimile terminal 82 or to an external mail server 92 via a telephone line 81 or network 91.

The memory control part 20 reads the information from the memory device 3 of the memory-equipped sheet 1 by using the reading part 21 and carries out writing of information to the memory device 3 of the memory-equipped sheet 1 by way of the writing part 22.

The sheet discharging part 30 has a construction in which the sheet feed tray 31 and the sheet discharge tray 32 are integrated and carries out sheet feeding and sheet discharging. The memory-equipped sheet 1 is placed on the sheet feed tray 31 and accommodated therein.

The scanner part 40 performs the function of a scanner reading the images on the memory-equipped sheet 1.

The image forming part 50 has a function of performing image formation on the sheet 2 of the memory-equipped sheet 1.

The sheet feeding apparatus 60 holds the memory-equipped sheets 1 for image formation in the form of stack, wherein each of the sheet feed tray A61, the sheet feed tray B62 and the sheet feed tray N63 holds one or more memory-equipped sheets 1 arbitrarily.

The apparatus control part 70 controls the overall operation of the image forming apparatus 10. The apparatus operation part 71 is a user interface used for operating the image forming apparatus 10 via the apparatus control part 70 and functions further as the means for inputting search keyword for selecting a specific memory-equipped sheet 1; outputting (or displaying) the document list; and inputting the information for selecting a specific memory-equipped sheet 1 from the document list.

The document search and selection application 72 is an application program accommodated in the apparatus control part 70 and is executed by a microcomputer, or the like, that constitutes the main control part of the apparatus control part 70. Thereby, the document search and selection application 72 functions as the means for performing various information processing including creation of document list, carrying out keyword search, carrying out document selection, or the like, based on the information obtained from the memory control part 20.

This document search and selection application 72 can be operated via the apparatus operation part 71 or from the external information processing terminal 93 via the printer driver 94. Thus, the external information processing part 93 also functions as the means for inputting search keyword for selecting a specific memory-equipped sheet 1; outputting (or displaying) the document list; and inputting the information for selecting a specific memory-equipped sheet 1 from the document list.

The facsimile apparatus 80 carries out a facsimile (FAX) transmission of the memory-equipped sheet 1 placed on the sheet feed tray 31 to the external facsimile terminal 82 via the telephone line 81.

The network apparatus 90 carries out facsimile transmission of the information on the memory-attacked sheet 1 placed on the sheet feed tray 31 to the external mail server 92 by way of E-mail or Internet.

The external information processing terminal 93 is constructed from a personal computer, general purpose information processing apparatus, or the like. This external information processing terminal 93 can operate the image forming apparatus 10 via the network 91 by using the printer driver 94 therein.

The sheet transportation part 100 carries out transport of the memory-equipped sheet 1 between each of the memory control part 20, the sheet feeding part 30, the scanner part 40, the image forming part 50, the sheet feeding part 60, the sheet discharging part 110, the discarding part 120 and the trays cooperating therewith.

Upon completion of processing of the image forming apparatus 10, the memory-equipped sheet 1 is discharged by the sheet discharging part 110. Thereby, the discharged memory-equipped sheet 1 is held by any of the sheet discharge tray A111, the sheet discharge tray B112 and the sheet discharge tray N113. Further, the sheet discharging part 110 is provided with the stapling part 114 and it is possible to apply a stapling process to the memory-equipped sheets stacked on the discharge tray after the sheet discharging process.

The discarding part 120 can also discard the memory-equipped sheet 1 subjected to discarding after applying thereto a shredding processing. Thereby, the scrap of the memory-equipped sheet 1 formed by the discarding process is collected into the discard tray 121.

In order that the image forming apparatus 10 can perform the functions thereof efficiently with regard to the memory-equipped sheet 1 formed already with images and recorded already with information, there is a need that the image forming apparatus 10 can recognize the memory-equipped sheet 1.

The most significant point of the memory-equipped sheet 1 over the sheets not provided with memory devices is that it is possible, with such a memory-equipped sheet 1, to recognize what kind of image formation and information recording has been made by using the memory device 3.

With the present invention, there are provided the functions of: reading information from the memory device 3; selecting a specific memory-equipped sheet 1 out of a plurality of memory-equipped sheets 1; and searching a specific memory-equipped sheet 1.

In a preferred example, the memory control part 20 is disposed inside the sheet feed part 30 or sheet transportation part 100, or adjacent to both of them in the image forming apparatus 10.

By providing the memory control part 20 on the sheet feeding and discharging part 30, it becomes possible to perform the information reading from the memory device 3 on the memory-equipped sheet by simply placing the memory-equipped sheet 1 on the sheet feed tray 31 of the sheet feeding and discharging part 30, without operating the sheet feeding and discharging part 30. Further, it is also possible to operate the sheet feeding and discharging apparatus 30 alone and carry out reading of the information of the memory device 3 of each memory-equipped sheet 1 during the process of separating the memory-equipped sheet 1 one by one from the sheet feed tray 31 and forwarding the same to the discharge tray 32.

In the case the memory reading part 20 is provided on the sheet feeding and discharging part 30 like this, there arises no problem of reading the information in the memory device 3 of the memory-equipped sheet 1 on the sheet feed tray 31 as long as the sheet feed tray 31 holds thereon a single sheet. In the case there are plural memory-equipped sheets 1 stacked on the sheet feed tray 31, on the other hand, all the memory-equipped sheets 1 are recognized simultaneously and it is not possible or becomes difficult to distinguish the memory-equipped sheets 1 from each other.

With the image forming apparatus 10, the memory-equipped sheet 1 is separated and transported from the sheet feeding and discharging part 30 to the sheet transportation part 100 one by one, and thus, it becomes possible to read the information from the memory device 3 of the memory-equipped sheet 1 by providing the memory control part 20 to the sheet transportation part 100, irrespective of the number of the sheets stacked on the sheet feeding and discharging part 30.

Thus, it is concluded that the memory control part 20 is provided preferably to the sheet feeding and discharging part 30 or sheet transportation part 100, while it is also possible that the memory control part 20 is provided, in the case the sheet feeding and discharging part 30 and the sheet transportation part 100 are disposed adjacent with each other, to the part where these parts are formed.

Next, explanation will be made for document search and document selection of the present invention. First, the document list created and outputted as a result of searching and selection will be explained with reference to FIG. 3.

A document list 200 includes, for each document, a list number 201, document attribute data 202 and document print data 203, wherein the document list 200 thus designed is outputted with the output format shown in FIG. 3.

Creation of this document list 200 is started in response to inputting of instruction of the user from the apparatus operation part 71 or from the external information processing terminal 93. Thereby, the creation of this document list 200 is executed by the document search and selection application program 72 accommodated in the apparatus control part 70 or by the printer driver 94 of the external information processing terminal 93 having an equivalent function, wherein the creation of the document list is carried out primarily by the document search and selection application 72. On the other hand, in anticipation of the case in which the processing load therefor is too burdensome for the apparatus control part 20, it is preferable that the image forming apparatus 10 has a construction of allowing the external information processing terminal 93 to perform this function by using the printer driver 94. While the explanation hereinafter will be made for the case in which the processing is carried out by the document search and selection application program 72, it should be noted that this processing can be carried out also by the printer driver 94 of the external information processing terminal 93.

Hereinafter, explanation will be made for the document search and selection processing carried out by the document search and selection application program 72 with reference to the flowchart of FIG. 4.

First, the user loads the memory-equipped sheets 1 subject to document search and selection on the sheet feed tray 31 in the step 1 and provides an instruction to create a document list 200 or start keyword search from the apparatus operation part 71 or external information processing terminal 93.

Next, in the step 2, the document search application program 72 judges whether or not it should carry out creation of the document list 200, and reading is made in the step 3, if it is judged in the step 2 that creation of the document list 200 should occur (YES in step 2), of the information of the entire memory-equipped sheets 1, stacked on the sheet feed tray 31 by using the memory control part 20. Further, in the step 4, the list number 201 is provided to each of the memory-equipped sheets 1, and with this, the document list 200 is created.

When creating the document list 200 by the document search and selection application program 72, it is important to note that creation of the document list 200 is not the only function of the document search and selection application program 72 but the document selection and search application 72 can also execute the function of displaying the document list 200 to the user of the image forming apparatus 10 based on the document list 200. Thus, the document list 200 is displayed on the user interface of the apparatus operation part 71.

In a preferable design of the document list 200, the items such as list number 201, the document attribute data 202 and the document print data 203 are aligned in a row, and the actual data contents are displayed in a columnar direction in each of the items.

When to display the document list 200, setting is made with regard to display or no display for a part or entirety of the document attribute data 4 and the document print data 5, and based thereupon, display is made as to the document attribute data 202 and the document print data 203. In a preferred example, this setting can be changed by a user as desired. For example, in the case the user has judged that it is preferable to represent only the document name for the display of the document attribute data 202, it is possible for the user to change the display setting such that the document list 200 represents only the document name.

For the preferable example of the user interface on which the document list 200 is displayed, it is possible to use the display screen of the apparatus operation part 71 provided to the image forming apparatus 10 or the display screen of the external information processing terminal for this purpose.

After thus displaying the document list 200, judgment is made in the step 5 as to whether or not to execute keyword search for the document list 200.

When it is possible to carry out the keyword search, a keyword inputted from the apparatus operational part 71 or from the external information processing terminal 93 is incorporated in the step 6 (Keyword Input), and the keyword search is executed in the step 7 in search of the document (a specific memory-equipped sheet 1) having the keyword coincident to the inputted keyword with regarded to the documents cited in the document list 200. Further, based on the result of the keyword search, the document list 200 is updated and re-displayed in the step 8.

It should be noted that this keyword search conducted for the documents in the document list 200 is the function that allows a user to search a desired document efficiently by providing a list of documents shown in the form of document list 200. In a preferable example of keyword search function, it is possible for the user to use the search function of text editing tool or network search engine such as Google. The result of the keyword search can be represented on the re-display screen in the form of highlighting of coincident keywords, or highlighting of hit documents, or representation of only the hit documents in the re-display list.

Further, it is preferable to add those parameters not displayed in the list because of the limitation imposed at the time of display of the document list 200 also to the subject of selection when the keyword selection is to be carried out for the document attribute data 202 or document print data 203.

Further, by enabling keyword input via the apparatus operation part 71, there is obtained an advantageous feature that the user can carry out a series of operations without stepping away from the image forming apparatus 10. Further, by enabling the keyword input from the external information processing terminal 93, there becomes no need of providing the character input device to the image forming apparatus 10, and there is attained a preferable feature that it is possible to provide a high-performance image forming apparatus 10 while using a simple device for the apparatus operation part 71.

Further, after displaying the document list 200 and the keyword search has been completed subsequently as noted above (YES in the step 9), or when it is judged that the keyword search is not to be made for the document list 200 after displaying the document list 200 (NO in the step 5), judgment is made in the step 10 as to whether or not selection of documents within the list 200 is to be made.

When it is possible to select the documents within the list 200, a list selection process for selecting the documents within the document list 200 is carried out in the step 11, and the result of the list selection process is re-displayed in the step 12 in the form of the document list 200.

It should be noted that this list selection function applied to the documents within the document list 200 is the function that selects one or more specific documents (specific memory-equipped sheet 1) and implements thereto the function of the image forming apparatus 10 selectively. The selection within the document list 200 is carried out by using the apparatus operation part 71 of the image forming apparatus 10 or the external information processing terminal 93. The result of the list selection is re-displayed in the form of "highlighted display of pertinent documents in the list" or "re-display of the list showing only the pertinent document out from the entire list". The steps 10-12 are repeated until it is judged that the list selection is completed in the step 13.

Further, in the case the list selection is not to be executed in the document list 200 (NO in the step 10), judgment is made in the step 14 as to whether editing of the document list is complete or not, and if YES, the processing result is provided to the next processes to be explained later.

Further, in the case the result of the judgment in the step 2 is NO, and hence the document list 200 is not to be formed, judgment is made in the step 15 as to whether the keyword search is to be made or not.

In the case it is possible to carry out the keyword search without the document list 200 (YES in the step 15), the keyword inputted from the apparatus operation part 71 or the external information terminal 93 is incorporated in the step 16 (Keyword Input), and the memory-equipped sheet 1 stacked on the sheet feed tray 31 is separated and supplied one by one in the step 17 and the information recorded in the memory device 3 of the memory-equipped sheet 1 is read by the information reading part 21 of the memory control part 20. Further, the keyword search is carried out for the document (specific memory-equipped sheet 1) having the keyword coincident to the inputted keyword at the same time.

Unlike the keyword search conducted to the document list 200 in the step 7, it should be noted that this keyword search of the step 17 without the document list 200 is the function that applies the keyword search to the document attribute data 4 and the document print data 5 for any of the memory-equipped sheets 1 separated from the stack of the memory-equipped sheets 1 on the sheet feed tray 31 one by one. While this processing may sometimes not be able to provide detailed search and selection processing as in the case of using the document list 200, it nevertheless provides simpler processing with regard to the memory-equipped sheets 1.

Another difference is that, while the process of keyword search within the document list 200 explained previously is designed to reflect the search result to the document list 200, the keyword search result of the step 17 becomes the final result in view of absence of the document list 200.

Thus, by providing the means for selecting a specific memory-equipped sheet out of a plurality of memory-equipped sheets based on the information recorded to the memory devices, it becomes possible to search a desired document easily and the work efficiency of the user is improved.

By providing the means for creating the document list 100 with regard to the plurality of memory-equipped sheets and outputting the same based on the information recorded to the memory-equipped sheets, it becomes possible to select a specific sheet by applying a keyword search to the document list thus obtained, and the work efficiency is improved further. Further, by selecting a specific memory-equipped sheet by conducting the keyword search in correspondence to the inputted keyword, it becomes possible to search and select a specific memory-equipped sheet and the work efficiency is improved further.

Further, by providing the means for creating the document list with regard to the plurality of memory-equipped sheets based on the information recorded on the memory-equipped sheets and further outputting the document list thus formed, it becomes possible to select the desired document (a specific memory-equipped sheet) out of the document list, and the work efficiency of the user is improved.

Next, the processing applied to a specific memory-equipped sheet 1 obtained by applying the search or selection (including search "and" selection, and search "or" selection) to the documents will be explained below.

First, a distributing processing that distributes the selected documents (specific memory-equipped documents) and non-selected documents (memory-equipped sheets 1 other than the specific memory-equipped sheets 1) will be explained with reference to FIG. 5.

Figure 4:
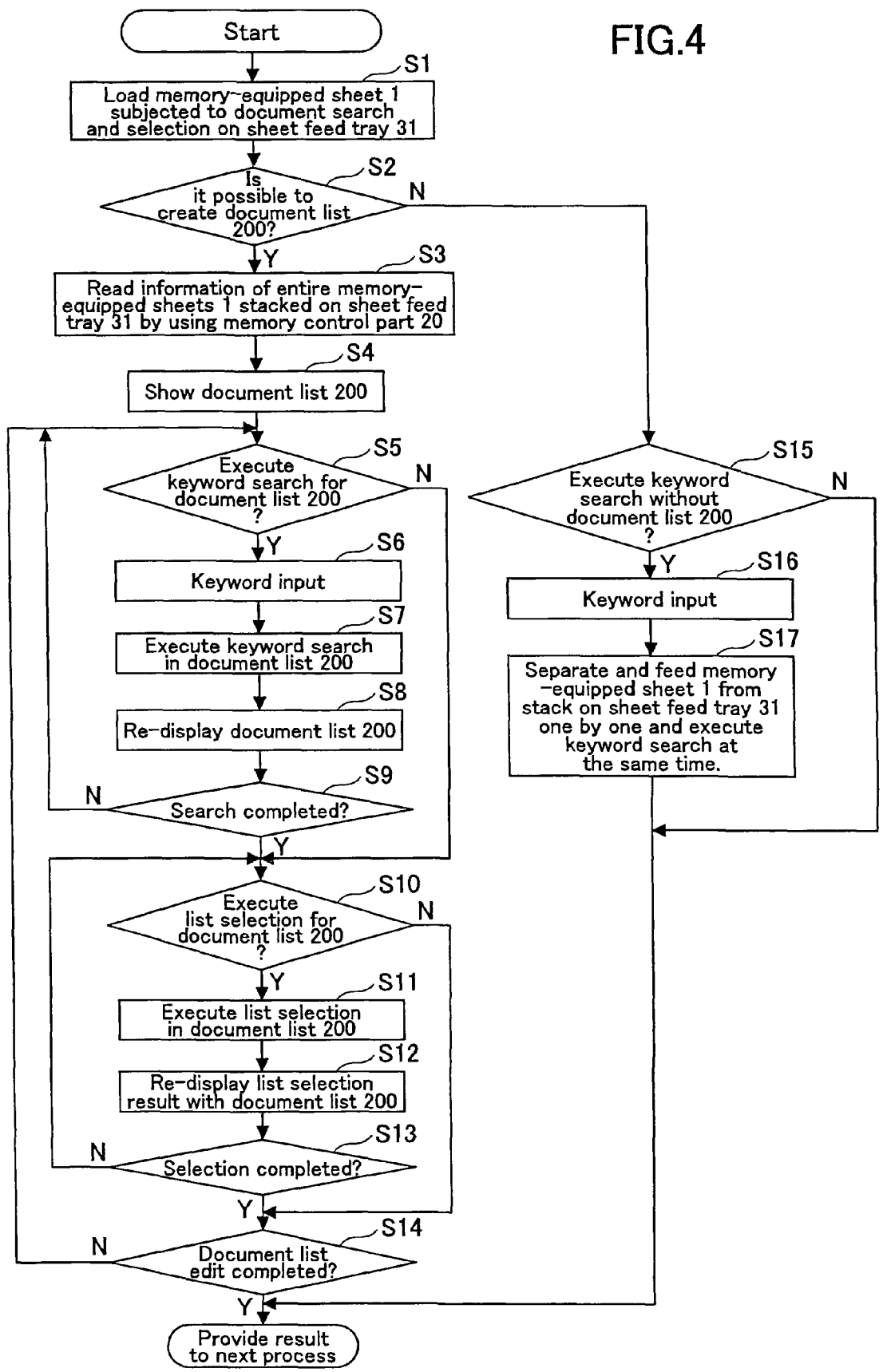
FIG. 4 is a flowchart showing an example of the processing for searching and selecting a specific memory-equipped sheet.
Figure 5:
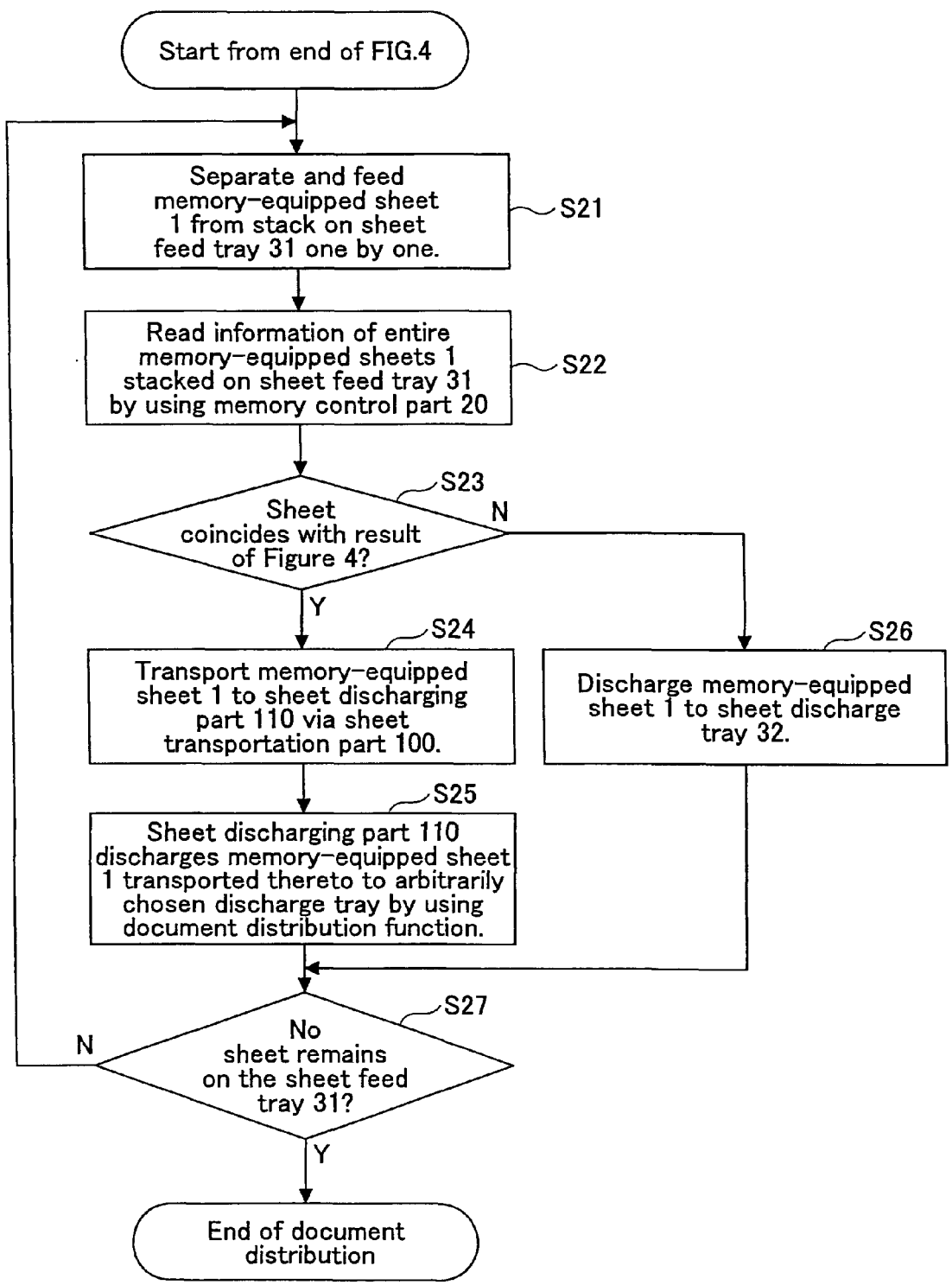
FIG. 5 is a flowchart showing an example of the distribution processing of selected documents.

Referring to FIG. 5, the memory-equipped sheet 1 is separated in the step 21 from the sheet feed tray 31 one by one and the information in the memory device 3 of the memory-equipped sheet 1 is read by the memory control part 20 in the step 22. Further, judgment is made in the step 23 as to whether or not the information thus read out coincides with the search and selection result of FIG. 4.

In the case the information read out coincides with the results of the search and selection (YES in the step 23), the memory-equipped sheet 1 is transported to the sheet discharging part 110 in the step 24 via the sheet transportation part 100, and the sheet discharging part 110 discharges the memory-equipped sheet 1 transported thereto in the step 25 to an arbitrarily chosen discharge tray (any of the sheet discharge tray 32, the sheet discharge tray A111, the sheet discharge tray B112 and the sheet discharge tray N113) by using a document distribution function. The setting of the tray to which the memory-equipped sheet 1 is to be distributed is set arbitrarily by the user.

In the case the information read out does not agree to the results of the search and selection (NO in the step 23) of FIG. 4, the memory-equipped sheet 1 is discharged in the step 26 to the sheet discharge tray 32.

Further, the foregoing processing is repeated until no sheet remains on the sheet feed tray 31, and when it is judged in the step 27 that there remains no sheet, the processing is terminated.

With this, the documents needed by the user such as "minutes of meeting" are distributed by merely setting the parameter "minutes of meeting" to the item "DOCUMENT NAME" of the document attribute data 4 as the search and selection condition and carrying out the selection of the pertinent memory-equipped document 1. With this, the work load for searching and retrieving the document "minutes of meeting" out of a large number of sheets can be eliminated and the work efficiency of the user is improved.

Next, the processing of carrying out sorting of the selected document and non-selected document will be explained with reference to FIG. 6.

Figure 6:
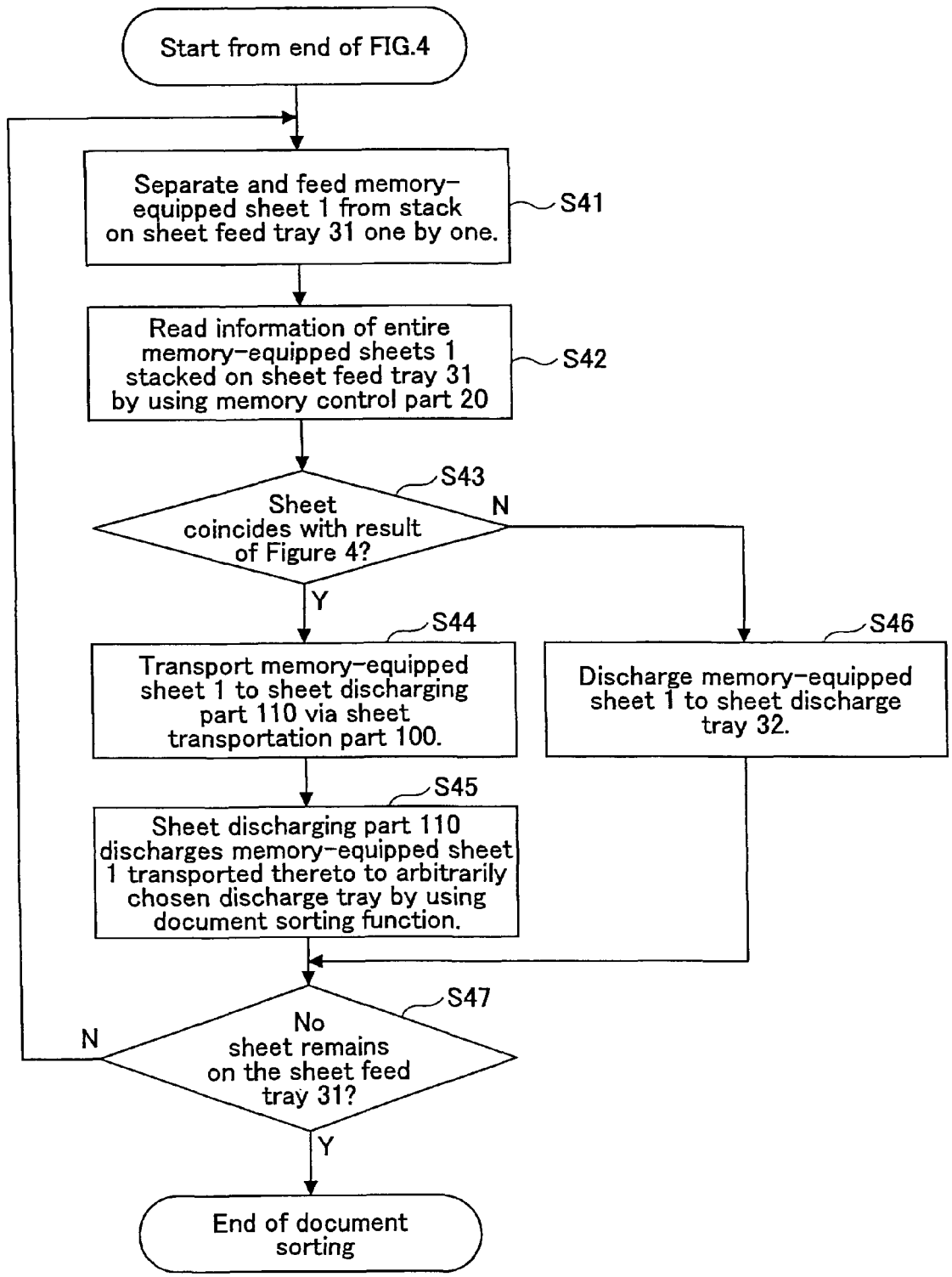
FIG. 6 is a flowchart showing an example of the sorting processing of selected documents.

Referring to FIG. 6, the memory-equipped sheet 1 is separated in the step 41 from the sheet feed tray 31 one by one in the step 41 and the information in the memory device 3 of the memory-equipped sheet 1 is read by the memory control part 20 in the step 42. Further, judgment is made in the step 43 as to whether or not the information thus read out coincides with the search and selection result of FIG. 4.

In the case the information read out coincides with the results of the search and selection (YES in the step 23), the memory-equipped sheet 1 is transported to the sheet discharging part 110 in the step 44, and the sheet discharging part 110 discharges the memory-equipped sheet 1 transported thereto in the step 45 to an arbitrarily chosen discharge tray (any of the sheet discharge tray 32, the sheet discharge tray A111, the sheet discharge tray B112 and the sheet discharge tray N113) with sorting by using the sorting function thereof. Here, the sorting (ascending order or descending order) is attained based on the data regarding the numeral stored in the document attribute data 4. It is possible for the user to choose as to on what item in the document attribute data 4 the sorting is to be conducted.

In the case the information read out does not agree to the results of the search and selection of FIG. 4 (NO in the step 43), the memory-equipped sheet 1 is discharged in the step 46 to the sheet discharge tray 32.

Further, the foregoing processing is repeated until no sheet remains on the sheet feed tray 31, and when it is judged in the step 47 that there remains no sheet, the processing is terminated.

With this, it becomes possible to direct the documents to any of the sheet discharge tray 32, the sheet discharge tray A111, the sheet discharge tray B112 and the sheet discharge tray N113 under the same document name for the item [DOCUMENT NAME] of the document attribute data 4 with sorting according to the item [PAGE NUMBER], or the like, of the document attribute data 4. Thereby, it becomes possible to eliminate the workload of the user of searching and retrieving a specific document from a large number of documents and the work efficiency of the user is improved.

Next, the processing of image formation on a selected document will be explained with reference to FIGS. 7 and 8.

Figure 7:
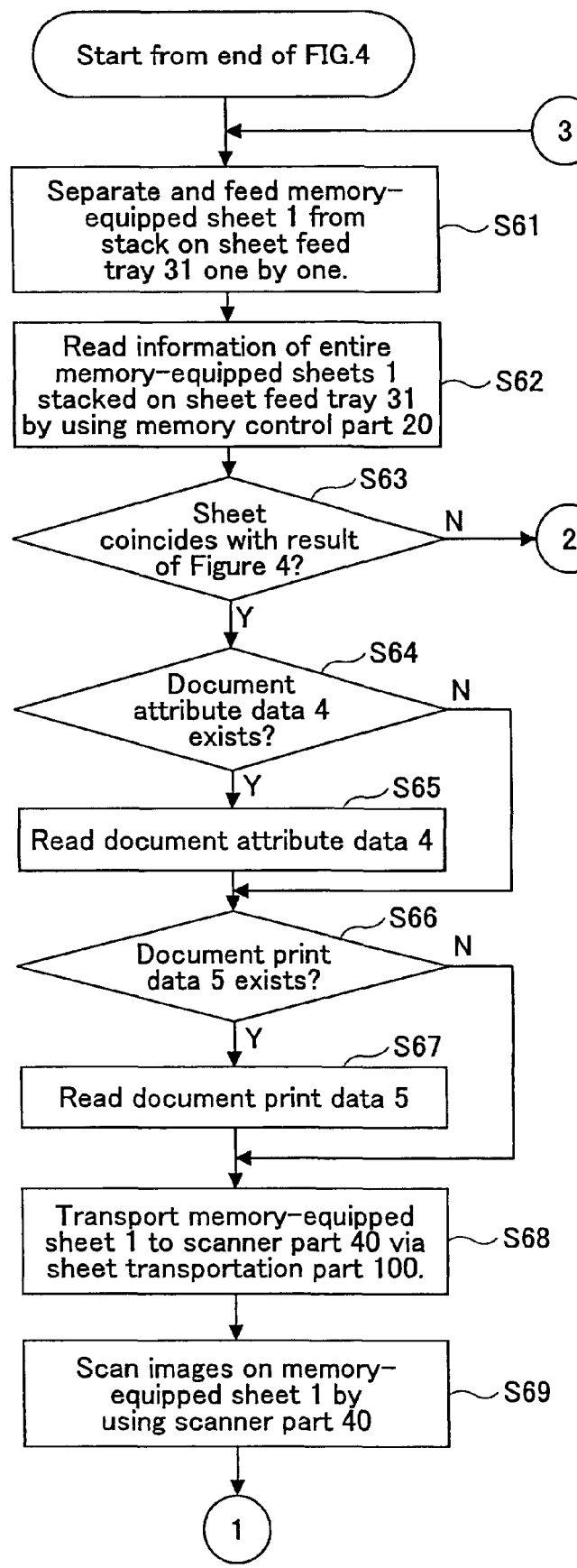
FIG. 7 is a flowchart showing an example of the copying processing of selected documents.

Referring to FIG. 7, the memory-equipped sheet 1 is separated in the step 61 from the sheet feed tray 31 one by one and the information in the memory device 3 of the memory-equipped sheet 1 is read by the memory control part 20 in the step 62. Further, judgment is made in the step 63 as to whether or not the information thus read out coincides with the search and selection result of FIG. 4.

Here, in the case the information read in the step 62 coincides with the results of searching and selection of FIG. 4 (YES in step 63), the step 64 is conducted in which it is judged whether or not there exists the document attribute data 4. If the document attribute data 4 exists (YES in step 64), the information of the document attribute data 4 is read out in the step 65, and the process proceeds to the step 66. When there exists no document attribute data 4 (NO in step 64), the process jumps to the step 66. In the step 66, judgment is made as to whether or not there exists the document print data 51, and when exists (YES in the step 66), the information of the document print data 5 is read out in the step 67 and the process proceeds to the step 68. When the document print data 5 does not exist (NO in the step 66), the process jumps to the step 68. In the step 68, the memory-equipped sheet under consideration is transported to the scanner part 40 via the sheet transportation part 100, and the image on the sheet 2 of the memory-equipped sheet 1 is scanned in the step 69 by the scanner part 40.

Figure 8:
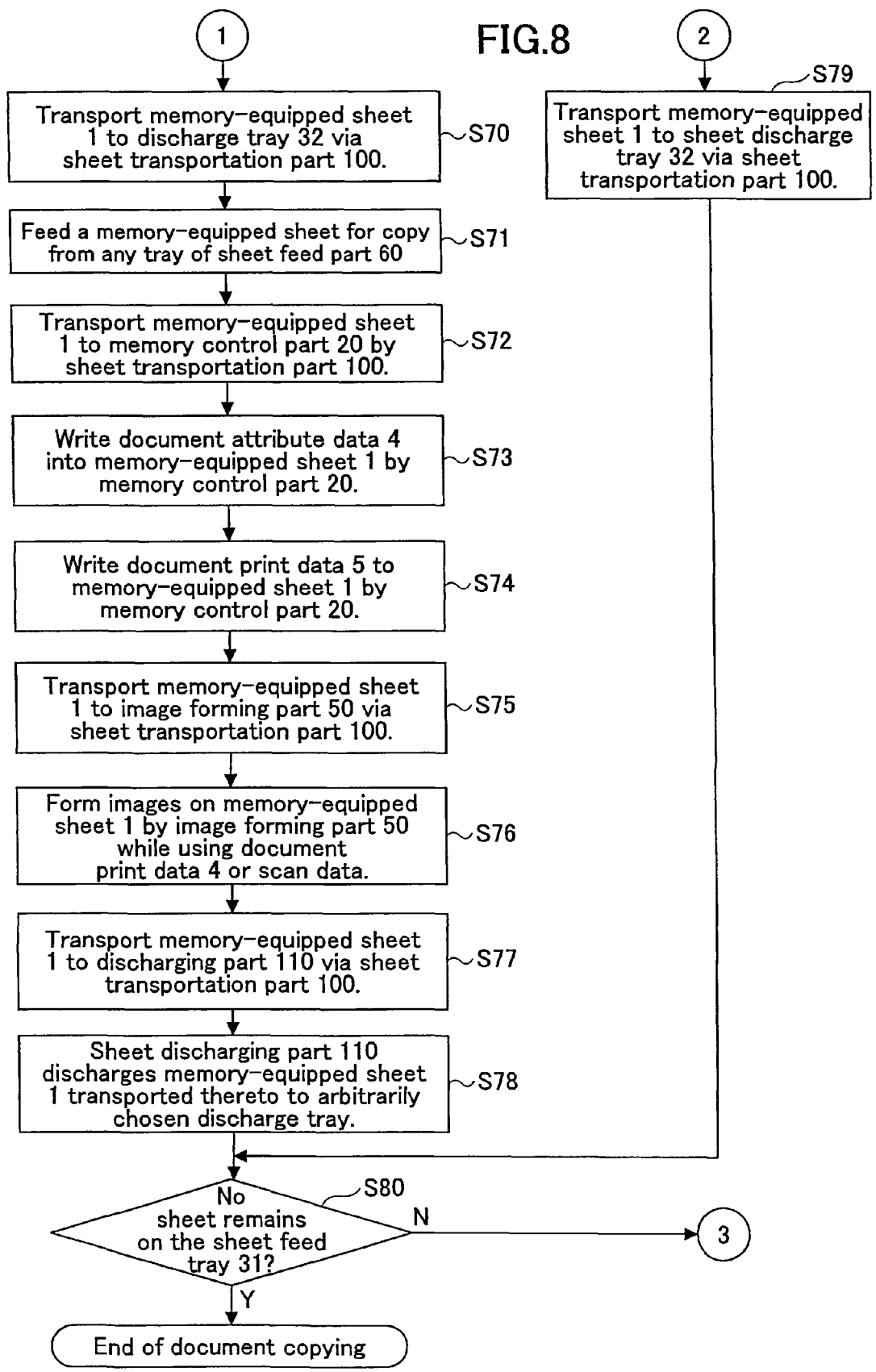
FIG. 8 is a flowchart of the processing following FIG. 7.

Thereafter, as shown in the step 70 of FIG. 8, the memory-equipped sheet 1 under consideration is transported to the sheet discharge tray 32 via the sheet transportation part 100.

Further, in the step 71, a memory-equipped sheet 1 for copying is fed to the sheet transportation part 100 from any of the sheet feed tray A61, the sheet feed tray B62 and the sheet feed tray N63 of the sheet feed part 60, and the sheet transportation part 100 transports the memory-equipped sheet 1 fed thereto to the memory control part 20 in the step 72.

Thus, the memory control part 20 writes the information of the document attribute data into the memory-equipped sheet 1 supplied thereto in the step 73 and further the information of the document print data 5 in the step 74. Thereafter, the memory-equipped sheet 1 is transported to the image forming part 50 in the step 75 via the sheet transportation part 100.

The image forming part 50 forms the images on the sheet 2 of the memory-equipped sheet 1 transported thereto in the step 76 while using the document print data 5 or the scan data.

Thereafter, in the step 77, the memory-equipped sheet 1 thus formed with the images is transported to the sheet discharging part 110 via the sheet transportation part 100, wherein the sheet discharging part 110 discharges the memory-equipped sheet 1 to any of the arbitrarily chosen sheet discharge tray A111, the sheet discharge tray B112 and the sheet discharge tray N113 in the step 78.

On the other hand, in the case the information of the memory-equipped sheet 1 fed from the sheet feed tray 31 is not coincident with the result of the search and selection of FIG. 4 (NO in step 63), the memory-equipped sheet 1 under consideration is supplied to the sheet feed tray 32 via the sheet transportation part 100 in the step 79 as shown in FIG. 8. Thereby, the memory-equipped sheet 1 is discharged straight to the discharge tray 32.

Further, the foregoing processing is repeated until no sheet remains on the sheet feed tray 31, and when it is judged in the step 80 that there remains no sheet, the processing is terminated.

Thus, the printed images on the memory-equipped sheet 1 held on the sheet feed tray 31 and further the document attribute data 4 and the document print data 5 in the memory device 3 on the memory-equipped sheet 1 become the copy source. The foregoing copy source is copied to the new memory-equipped sheets 1 held on any of the sheet feed tray A61, the sheet feed tray B62 or the sheet feed tray N63 of the sheet feeding part 60 and further to the memory parts 3 provided thereon. The copy source is thereby discharged to the discharge tray 32 after completion of copying, and the copy results are discharged to any of the discharge tray A111, the discharge tray B112 and the discharge tray N113.

With this, the document needed by the user such as "minutes of meeting" is searched and copied selectively by merely setting the parameter "minutes of meeting" to the item [DOCUMENT NAME] as the search and selection condition. With this, the work load of the user for searching and retrieving the document "minutes of meeting" out of a large number of sheets can be eliminated and the work efficiency of the user is improved.

Next, scanning processing of selected document will be explained with reference to FIGS. 9 and 10.

Figure 9:
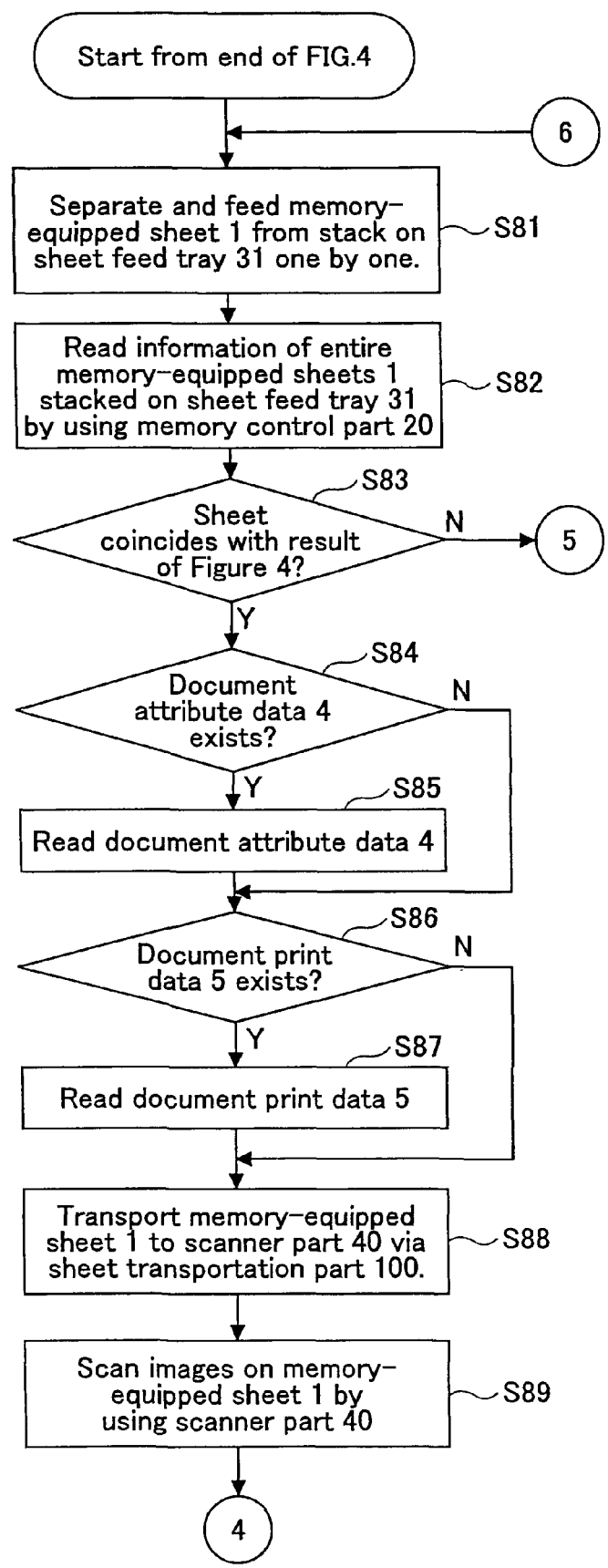
FIG. 9 is a flowchart showing an example of the scanning processing of selected documents.

Referring to FIG. 9, the memory-equipped sheet 1 is separated in the step 81 from the sheet feed tray 31 one by one and the information in the memory device 3 of the memory-equipped sheet 1 is read by the memory control part 20 in the step 82. Further, judgment is made in the step 83 as to whether or not the information thus read out coincides with the search and selection result of FIG. 4.

Here, in the case the information read out from the memory device 3 of the memory-equipped sheet 1 coincides with the result of search and selection of FIG. 4 (YES in step 83), judgment is made in the step 84 as to whether or not there exists document attribute data 4, and when there exists such document attribute data 4 (YES in step 84), the information of the document attribute data 4 is read out in the step 85 and the process proceeds to the step 86. When there exists no document attribute data e (NO in step 84), the process proceeds straight to the step 86 and judgment is made therein as to whether or not there exists the document print data 4. When there exists the document print data 5 (YES in step 86), the information of the document print data 5 is read out in the step 87 and the process proceeds to the step 88. When there exists no document print data 5 (NO in step 86), the process proceeds straight to the step 88, wherein the memory-equipped sheet 1 under consideration is transported to the scanner part 40 via the sheet transportation part 100 in the step 88, and the images on the memory-equipped sheet 2 is scanned by the scanner part 40 in the step 89.

Figure 10:
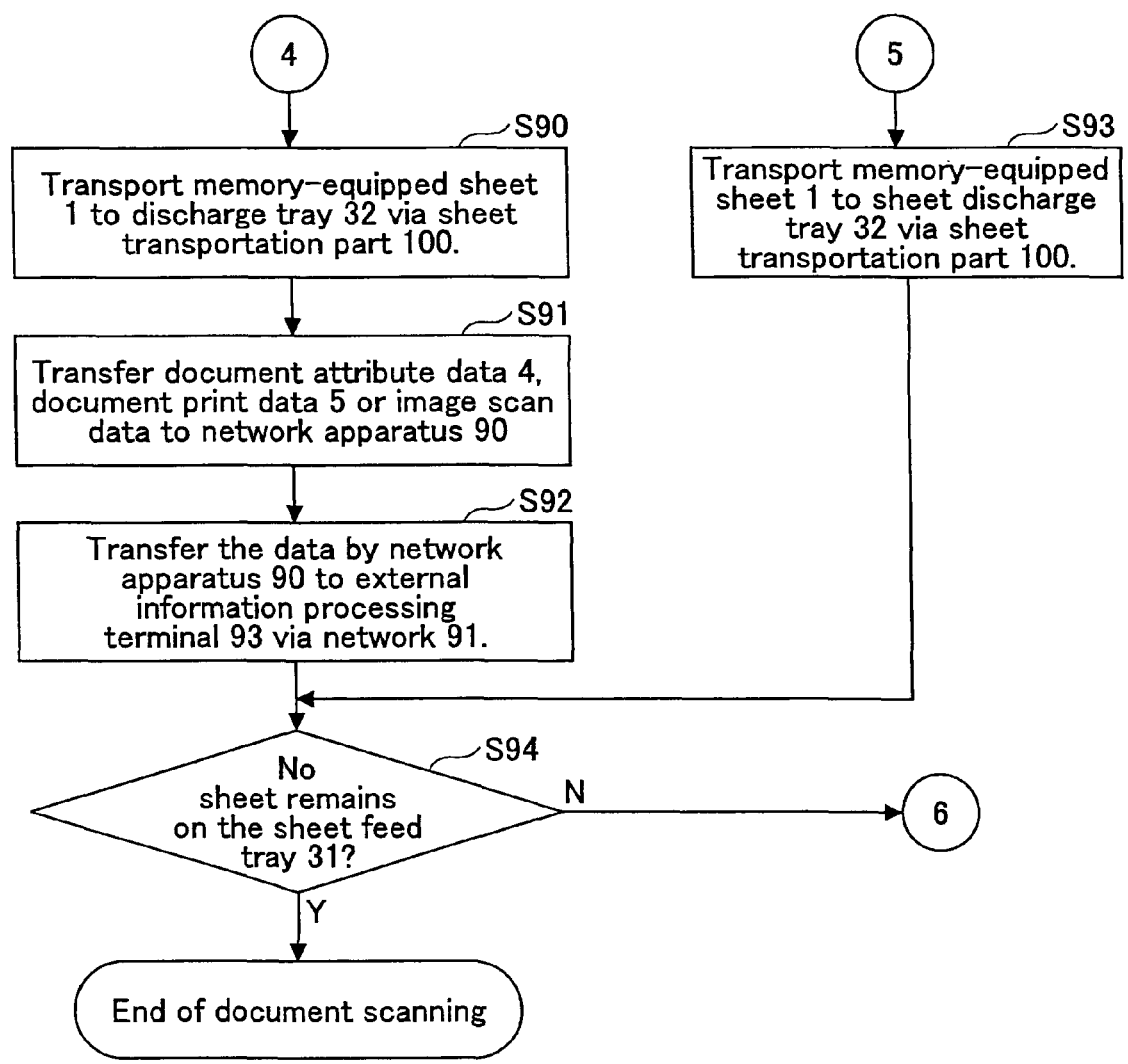
FIG. 10 is a flowchart of the processing following FIG. 9.

Thereafter, as shown in the step 90 of FIG. 10, the memory-equipped sheet 1 under consideration is transported to the sheet discharge tray 32 via the transportation part 100.

Further, in the step 91, the document data 4, the document print data 5 and the image scanning data are transferred to the network apparatus part 90.

Further, in the step 92, the network apparatus part 90 transfers the received data to the external information processing terminal 93 via the network 91.

On the other hand, in the case the information of the memory-equipped sheet 1 fed from the sheet feed tray 31 is not coincident with the result of the search and selection of FIG. 4 (NO in step 83), the memory-equipped sheet 1 under consideration is supplied to the sheet feed tray 32 via the sheet transportation part 100 in the step 93 as shown in FIG. 10. Thereby, the memory-equipped sheet 1 is discharged straight to the discharge tray 32.

Further, the foregoing processing is repeated until no sheet remains on the sheet feed tray 31, and when it is judged in the step 94 that there remains no sheet, the processing is terminated.

Thus, the printed images on the memory-equipped sheet 1 held on the sheet feed tray 31 and further the document attribute data 4 and the document print data 5 in the memory device 3 on the memory-equipped sheet 1 become the scan source. Thereby, the scan data is stored in the image forming apparatus 10 or the external information processing terminal 93.

With this, the document needed by the user such as "minutes of meeting" is searched and scanned selectively by merely setting the parameter "minutes of meeting" to the item [DOCUMENT NAME] as the search and selection condition. With this, the work load for searching and retrieving the document "minutes of meeting" out of a large number of sheets can be eliminated and the work efficiency of the user is improved.

Next, the processing of carrying out printing of the selected document will be explained with reference to FIG. 11.

Figure 11:
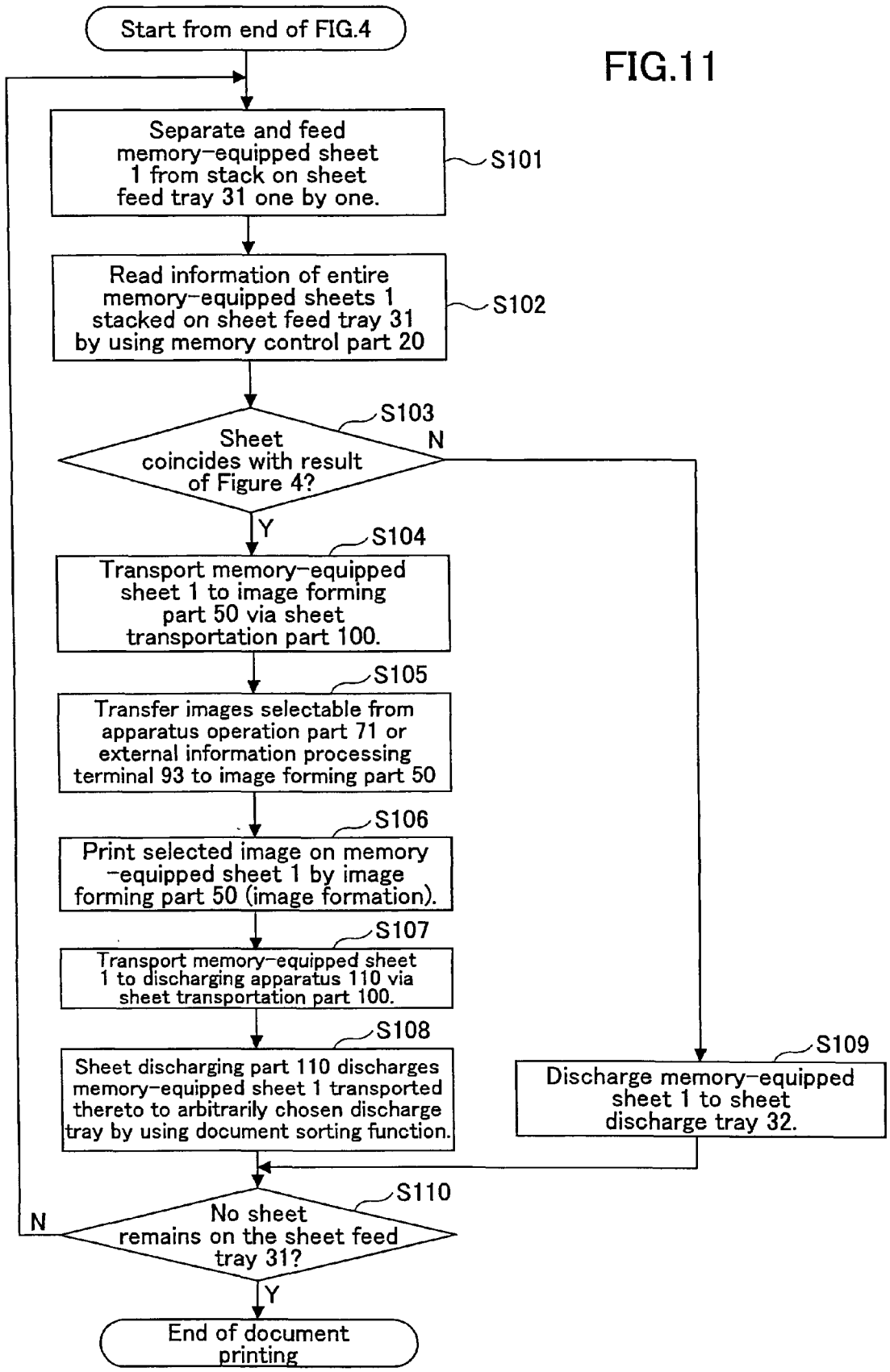
FIG. 11 is a flowchart showing an example of the printing processing of selected documents.

Referring to FIG. 11, the memory-equipped sheet 1 is separated in the step 101 from the sheet feed tray 31 one by one and the information in the memory device 3 of the memory-equipped sheet 1 is read by the memory control part 20 in the step 102. Further, judgment is made in the step 103 as to whether or not the information thus read out coincides with the search and selection result of FIG. 4.

In the case the result of reading of the information from the memory device 3 of the memory-equipped sheet 1 is coincident to the result of search and selection of FIG. 4 (YES in step 103), the memory-equipped sheet 1 is transported to the image forming part 50 in the step 104 via the sheet transportation part 100. Further, in the step 105, the images that can be selected are transferred to the image forming part from the apparatus operation part 71 or the external information processing terminal 93. Further, in the step 106, the image forming part 50 carries out printing of the selected images thus transported (image formation) on the memory-equipped sheet 1. Thereafter, the memory-equipped sheet 1 completed with the printing process is transported to the sheet-discharging part 110 in the step 107 via the sheet transportation part 100, and the memory-equipped sheet 1 completed with printing is discharged to any of the sheet discharge tray A111, sheet discharge tray B112 and the sheet discharge tray N113 selected arbitrarily.

On the other hand, in the case the information of the memory-equipped sheet 1 fed from the sheet feed tray 31 is not coincident with the result of the search and selection of FIG. 4 (NO in step 103), the memory-equipped sheet 1 under consideration is supplied to the sheet feed tray 32 via the sheet transportation part 100 in the step 109. Thereby, the memory-equipped sheet 1 is discharged straight to the sheet discharge tray 32.

Further, the foregoing processing is repeated until no sheet remains on the sheet feed tray 31, and when it is judged in the step 110 that there remains no sheet, the processing is terminated.

With this, it becomes possible to add the designation such as "FOR INTERNAL USE ONLY" or "CONFIDENTIAL" to the documents classified for "internal use only" based upon the document attribute data 4. Thereby, the workload for searching and selecting a specific document out of a large number of documents can be omitted and the work efficiency of the user is improved.

Next, the processing of carrying out discarding of the selected document will be explained with reference to FIG. 12.

Figure 12:
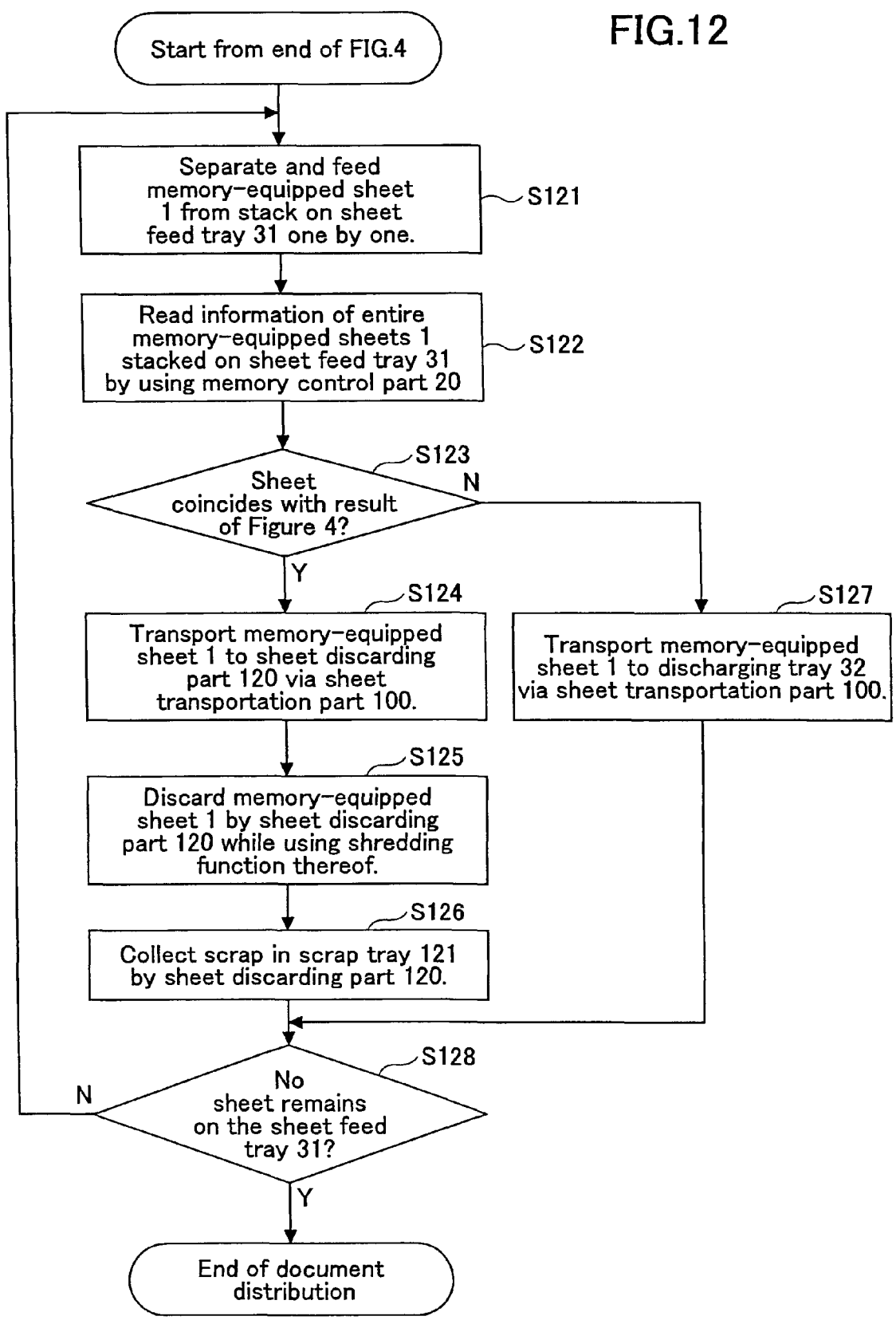
FIG. 12 is a flowchart showing an example of the discarding processing of selected documents.

Referring to FIG. 12, the memory-equipped sheet 1 is separated in the step 121 from the sheet feed tray 31 one by one and the information in the memory device 3 of the memory-equipped sheet 1 is read by the memory control part 20 in the step 122. Further, judgment is made in the step 123 as to whether or not the information thus read out coincides with the search and selection result of FIG. 4.

In the case the result of reading of the information from the memory device 3 of the memory-equipped sheet 1 is coincident to the result of search and selection of FIG. 4 (YES in step 123), the memory-equipped sheet 1 is transported to the discarding part 120 in the step 124 via the sheet transportation part 100. Thereupon, the discarding part 120 discards the memory-equipped sheet 1 in the step 125 by using the shredding function thereof, wherein the discarding part 120 holds the shredded scrap in the step 126 in the discard tray 121.

On the other hand, in the case the information of the memory-equipped sheet 1 fed from the sheet feed tray 31 is not coincident with the result of the search and selection of FIG. 4 (NO in step 123), the memory-equipped sheet 1 under consideration is supplied to the sheet feed tray 32 via the sheet transportation part 100 in the step 127. Thereby, the memory-equipped sheet 1 is discharged straight to the sheet discharge tray 32.

Further, the foregoing processing is repeated until no sheet remains on the sheet feed tray 31, and when it is judged in the step 128 that there remains no sheet, the processing is terminated.

With this, it becomes possible to discard the documents by the document discarding apparatus upon confirmation of the expiration date or expiration of liability of preserve for the documents that are set with [EXPIRATION DATE] or [DOCUMENT PRESERVATION TERM] based on the document attribute data 4, and the workload for searching out a specific document from a large number of documents can be eliminated. With this, the work efficiency of the user is improved.

Next, the processing of carrying out stapling for selected documents will be explained with reference to FIG. 13.

Figure 13:
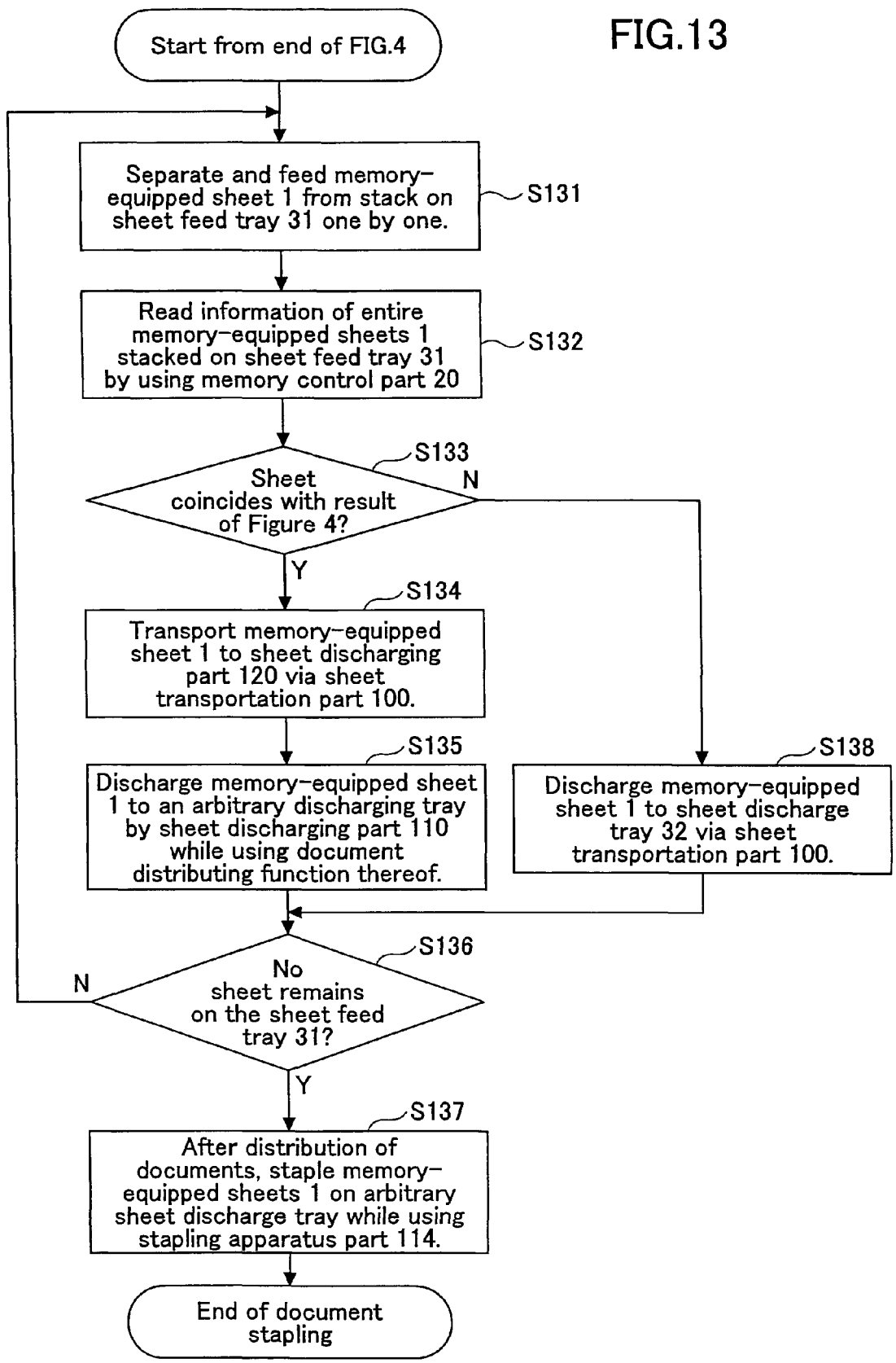
FIG. 13 is a flowchart showing an example of the stapling processing of selected documents.

Referring to FIG. 13, the memory-equipped sheet 1 is separated in the step 131 from the sheet feed tray 31 one by one and the information in the memory device 3 of the memory-equipped sheet 1 is read by the memory control part 20 in the step 132. Further, judgment is made in the step 133 as to whether or not the information thus read out coincides with the search and selection result of FIG. 4.

In the case the result of reading of the information from the memory device 3 of the memory-equipped sheet 1 is coincident to the result of search and selection of FIG. 4 (YES in step 133), the memory-equipped sheet 1 is transported to the discharging part 110 in the step 134 via the sheet transportation part 100. Thereupon, the sheet discharging part 110 discharges the selected memory-equipped documents 1 in the step 135 to any of the sheet discharge tray A111, the sheet discharge tray B112 and the sheet discharge tray N113 selected arbitrarily while using the document distributing function thereof.

On the other hand, in the case the information of the memory-equipped sheet 1 fed from the sheet feed tray 31 is not coincident with the result of the search and selection of FIG. 4 (NO in step 133), the memory-equipped sheet 1 under consideration is supplied to the sheet feed tray 32 via the sheet transportation part 100 in the step 138. Thereby, the memory-equipped sheet 1 is discharged straight to the sheet discharge tray 32.

The foregoing processes are repeated until it is judged in the step 136 that there remains no memory-equipped sheet 1 on the sheet feed tray 31, and after distributing the documents, the memory-equipped sheets 1 on any of the sheet discharge tray A111, the sheet discharge tray B112 or the sheet discharge tray N113 are stapled with the stapling part 114 in the step 137. With this, the stapling processing is completed.

With this, it becomes possible to discharge the memory-equipped sheets 1 with stapling for those memory-equipped sheets 1 coincident to the selection condition specified by [DOCUMENT NAME] in the document attribute data 4. Thereby, the workload of the user for searching and selecting a specific document out of a large number of documents can be omitted and the work efficiency of the user is improved.

Next, the processing of carrying out facsimile transmission of the selected document will be explained with reference to FIG. 14.

Figure 14:
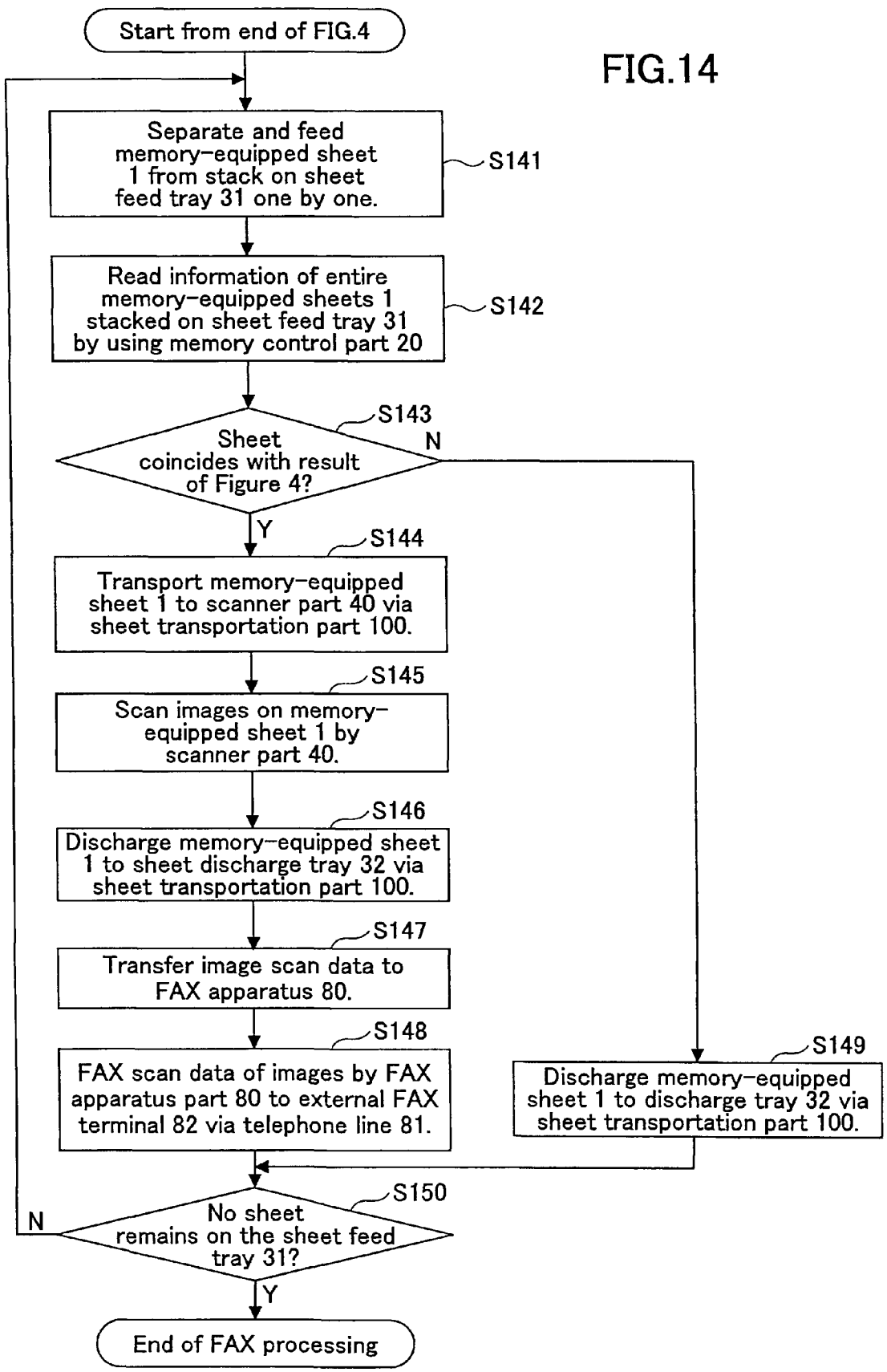
FIG. 14 is a flowchart showing an example of the facsimile transmission of selected documents.

Referring to FIG. 14, the memory-equipped sheet 1 is separated in the step 141 from the sheet feed tray 31 one by one and the information in the memory device 3 of the memory-equipped sheet 1 is read by the memory control part 20 in the step 142. Further, judgment is made in the step 143 as to whether or not the information thus read out coincides with the search and selection result of FIG. 4.

In the case the result of reading of the information from the memory device 3 of the memory-equipped sheet 1 is coincident to the result of search and selection of FIG. 4 (YES in step 143), the memory-equipped sheet 1 is transported to the scanner part 40 in the step 144 via the sheet transportation part 100. Thereupon, the scanner part 40 sans the images on the memory-equipped sheet 1 in the step 145. Further, in the step 146, the scanned memory-equipped sheet 1 is discharged to the sheet discharge tray 32 via the sheet transportation part 100. Further, in the step 147, the scan data of the images is transferred to the facsimile apparatus part 80. Further, in the step 148, the facsimile apparatus part 80 carries out facsimile transmission of the scan data of the images to the external facsimile terminal 82 via the telephone line 81.

On the other hand, in the case the information of the memory-equipped sheet 1 fed from the sheet feed tray 31 is not coincident with the result of the search and selection of FIG. 4 (NO in step 143), the memory-equipped sheet 1 under consideration is supplied to the sheet feed tray 32 via the sheet transportation part 100 in the step 149. Thereby, the memory-equipped sheet 1 is discharged straight to the sheet discharge tray 32.

Further, the foregoing processing is repeated until no sheet remains on the sheet feed tray 31, and when it is judged in the step 150 that there remains no memory-equipped sheet 1, the processing is terminated.

With this, it becomes possible for example to select a document [INVOICE] in which an arbitrary name is set in the item [SENDER] based on the document attribute data 4 and carry out facsimile transmission thereof. Thereby, the workload for searching and selecting a specific document out of a large number of documents can be omitted and the work efficiency of the user is improved.

Next, the processing of E-mail transmission and Internet facsimile transmission of a selected document will be explained with reference to FIGS. 15 and 16.

Figure 15:
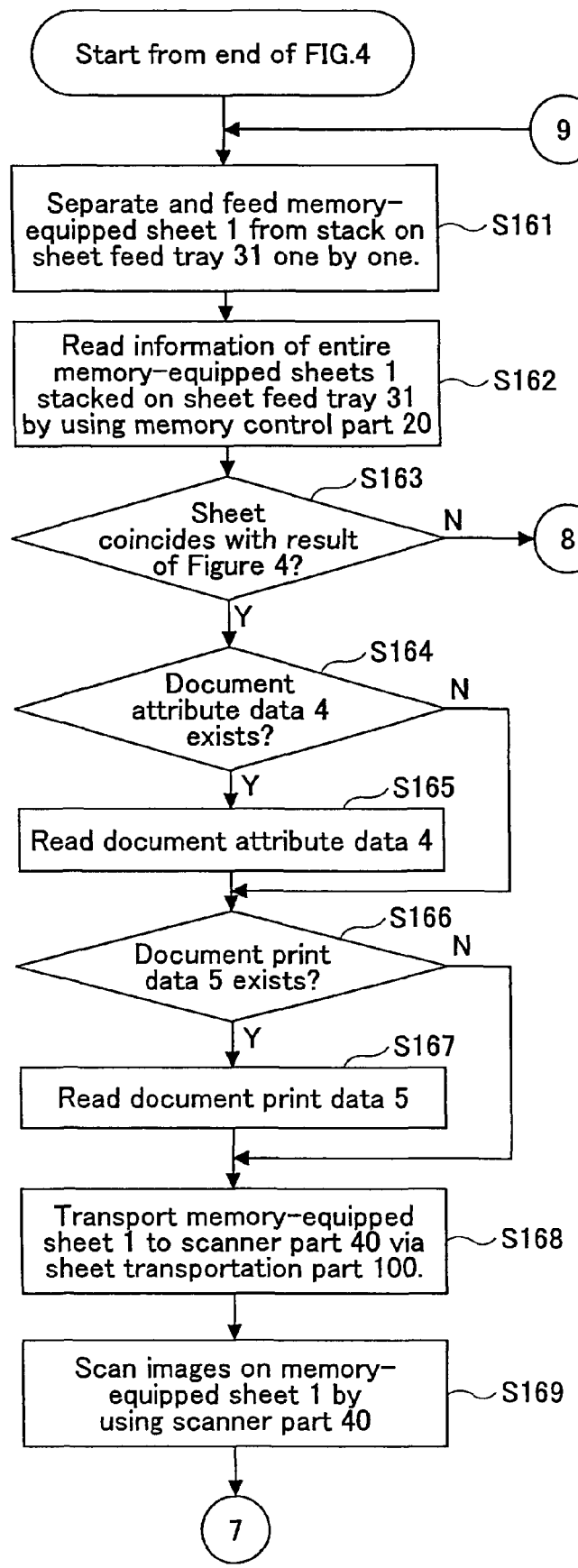
FIG. 15 is a flowchart showing an example of the E-mail or Internet facsimile transmission of selected documents.

Referring to FIG. 15, the memory-equipped sheet 1 is separated in the step 161 from the sheet feed tray 31 one by one and the information in the memory device 3 of the memory-equipped sheet 1 is read by the memory control part 20 in the step 162. Further, judgment is made in the step 163 as to whether or not the information thus read out coincides with the search and selection result of FIG. 4.

Here, in the case the information read out from the memory device 3 of the memory-equipped sheet 1 coincides with the result of search and selection of FIG. 4 (YES in step 163), judgment is made in the step 164 as to whether or not there exists document attribute data 4, and when there exists such document attribute data 4 (YES in step 164), the information of the document attribute data 4 is read out in the step 165 and the process proceeds to the step 166 thereafter. When there exists no document attribute data (NO in step 164), the process proceeds straight to the step 165. Thus, in the step 166, judgment is made as to whether or not there exists the document print data 6, and if there exists the document print data 5 (YES in step 166), the information of the document print data 5 is read out in the step 167 and the process proceeds to the step 168. When there exists no document print data 5 (NO in step 166), the process proceeds straight to the step 168. In the step 168, the memory-equipped sheet 1 under consideration is transported to the scanner part 40 via the sheet transport part 100 and the images on the sheet 2 of the memory-equipped sheet 1 is scanned in the step 169 by the scanner part 40.

Figure 16:
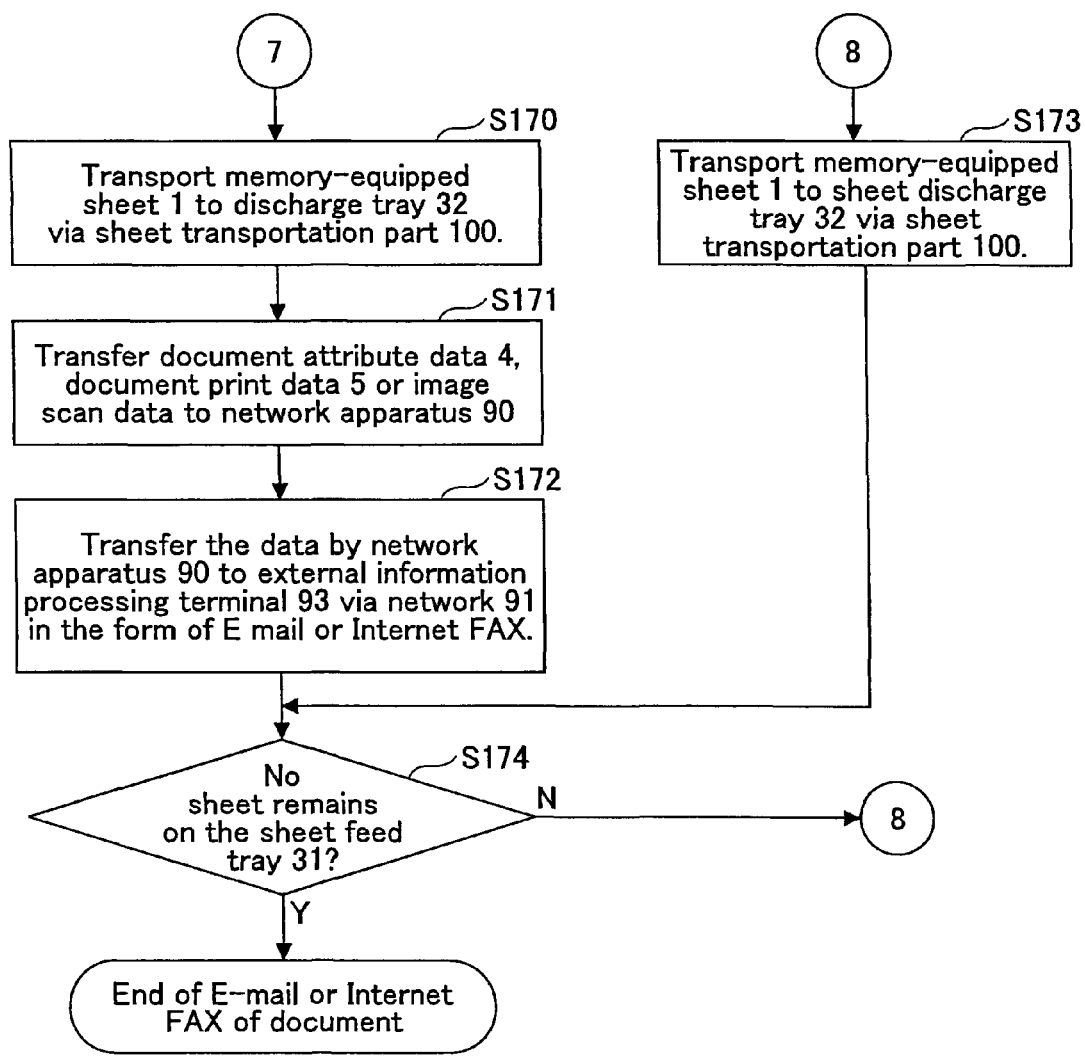
FIG. 16 is a flowchart of the processing following FIG. 15.

Thereafter, as shown in the step 170 of FIG. 16, the memory-equipped sheet 1 under consideration is transported to the sheet discharge tray 32 via the transportation part 100.

Further, in the step 171, the document data 4, the document print data 5 and the image scanning data are transferred to the network apparatus part 90.

Thereby, in the step 172, the network apparatus part 90 transfers the received data to the external mail server 92 in the form of E-mail or Internet Fax transmission via the network 91.

On the other hand, in the case the information of the memory-equipped sheet 1 fed from the sheet feed tray 31 is not coincident with the result of the search and selection of FIG. 4 (NO in step 163), the memory-equipped sheet 1 under consideration is supplied to the sheet feed tray 32 via the sheet transportation part 100 in the step 173 as shown in FIG. 16. Thereby, the memory-equipped sheet 1 is discharged straight to the discharge tray 32.

Further, the foregoing processing is repeated until no sheet remains on the sheet feed tray 31, and when it is judged in the step 174 that there remains no sheet, the processing is terminated.

With this, it becomes possible for example to select a document in which an arbitrary name is set to the item [RECEPIENT] based on the document attribute data 4 and carry out re-transmission of the document to the arbitrarily set recipient. Thereby, the workload for searching and selecting a specific document out of a large number of documents can be omitted and the work efficiency of the user is improved.

Next, an example of the sheet selection apparatus of the present invention as applied to a multifunction image forming apparatus with reference to FIG. 17. It should be noted that FIG. 17 is a schematic diagram showing the functions of various parts of an image forming apparatus 400 of the present embodiment, wherein those parts corresponding to the part of FIG. 2 are designated by the same reference numerals and the description thereof will be omitted.

Referring to FIG. 17, the image forming apparatus 400 has a construction similar to that of the image forming apparatus 10 of FIG. 2 explained before, except that the memory control part 20 is replaced with a scan information processing part 500. There, the scan information processing part 500 includes an information analyzing part 501 that analyzes the information held on a sheet, the information identifying the sheet when read by the scanner part 40, or the information that identifies the attribute of that sheet. The information thus obtained by the scanner information processing part 500 is handled similarly to the information obtained from the memory device 3 explained before and the image forming apparatus 400 carries out the processing such as the creation of document list or selection of the sheet as explained before.

In the present embodiment, the information identifying the sheet or the information identifying the attribute of the sheet is obtained by reading the content of the images on the sheet and applying an image analysis thereto. Further, it is also possible to embed information identifying the sheet or the attribute of the sheet to the sheet in advance in the form of invisible dots. In such a case, the embedded information is recovered by extracting the information part from the images read by the scanner. Further, when it is desired to provide larger amount of information at the time of creating the document list, it is also possible to record the information on the sheet in the form of barcode.

With such a sheet selection apparatus of the present embodiment, it is possible to carry out the selection of desired sheet from a large number of sheets also in the case of using non-memory-equipped sheet.

Next, other example of the multifunction image forming apparatus will be explained with reference to FIG. 18. It should be noted that FIG. 18 is a schematic diagram showing the functions of various parts of the image forming apparatus 10A of the present embodiment, wherein those parts corresponding to the part of FIG. 2 are designated by the same reference numerals and the description thereof will be omitted.

Referring to FIG. 18, the image forming apparatus 10A includes, in addition to the image forming apparatus 10 explained before, an external document server 600 holding the document file corresponding to the original, and the network apparatus 90 enables the image forming apparatus 10 to read out the document file from the external document file server via the network 91.

Thus, it is possible, at the time when a document list is created by reading the original memory-equipped sheet 2 and the user designates a target document based on the created document list, to extract the designated document out from the external document file server 600 and output the extracted document in the form of printing or in the form of display, in the case the image forming apparatus includes a display device not illustrated.

While the present invention has been explained for preferred embodiments, the present invention is by no means limited to such specific embodiments but various variations and modifications may be made without departing front the scope of the invention.

The present invention is based on Japanese priority applications 2006-144523 and 2007-059293 respectively filed on May 24, 2006 and Mar. 9, 2007, the entire contents of which are incorporated herein as reference.

The invention claimed is:

1. An apparatus capable of using a memory-equipped sheet, said memory-equipped sheet being a sheet equipped with a memory device, said apparatus reading information from respective memory devices of plural memory-equipped sheets as the memory-equipped sheets are separated and transported one by one, said apparatus comprising:

an outputting part configured to generate a document list with regard to the plural memory-equipped sheets, based on information recorded on the respective memory devices of the plural memory-equipped sheets, said outputting part being further configured to output the generated document list;

a selection part configured to determine whether or not the document list is to be generated, based on a received user instruction, wherein in a case that the selection part determines that the document list is to be generated and the outputting part generates the document list, (a) the selection part selects a specific memory-equipped sheet by carrying out a keyword search of said document list outputted by the outputting part based on a user-inputted search keyword, when the selection part receives a user instruction to perform the keyword search of the document list, and (b) the selection part further carries out a list selection process to the specific memory equipped sheet selected in (a), so as to finally select the specific memory equipped sheet, when the selection part receives a user instruction to perform the list selection process on the document list, and in a case that the selection part determines that the document list is not to be generated and the outputting part does not generate the document list, the selection part selects the specific memory equipped sheet by performing the keyword search directly on information read from the respective memory devices of the plural memory-equipped sheets as the memory-equipped sheets are separated and transported one by one, based on the user-inputted search keyword, when the selection part receives a user instruction to perform the keyword search.

2. The apparatus as claimed in claim 1, further comprising a distribution part that distributes said selected memory-equipped sheets.

3. The apparatus as claimed in claim 1, further comprising a sorting part that sorts said selected memory-equipped sheets.

4. The apparatus as claimed in claim 1, further comprising a copying part that copies said selected memory-equipped sheet.

5. The apparatus as claimed in claim 1, further comprising a reading part that reads said selected memory-equipped sheet.

6. The apparatus as claimed in claim 1, further comprising a printing part that prints said selected memory-equipped sheet.

7. The apparatus as claimed in claim 1, further comprising a part that discards said selected memory-equipped sheet.

8. The apparatus as claimed in claim 1, further comprising a stapling part that staples said selected memory-equipped sheets.

9. The apparatus as claimed in claim 1, further comprising a facsimile transmission part that carries out facsimile transmission of said selected memory-equipped sheet.

10. The apparatus as claimed in claim 1, further comprising a transmission part that carries out transmission of said selected memory-equipped sheet via any of E-mail and Internet facsimile.

* * * * *